US012745774B2

(12) United States Patent
Rodriguez et al.

(10) Patent No.: US 12,745,774 B2
(45) Date of Patent: Sep. 29, 2026

(54) SOLID PARTICULATE PEST CONTROL COMPOSITIONS AND METHODS

(71) Applicant: Control Solutions, Inc., Pasadena, TX (US)

(72) Inventors: Ian Rodriguez, Pasadena, TX (US); Douglas H. Ross, Pasadena, TX (US); Janis Reed, Pasadena, TX (US); Heather Erskine Patterson, Pasadena, TX (US); Marie Knox, Pasadena, TX (US); John Carespodi, Pasadena, TX (US)

(73) Assignee: Control Solutions, Inc., Pasadena, TX (US)

( * ) Notice: Subject to any disclaimer, the term of this patent is extended or adjusted under 35 U.S.C. 154(b) by 146 days.

(21) Appl. No.: 18/900,121

(22) Filed: Sep. 27, 2024

(65) Prior Publication Data

US 2025/0017211 A1 Jan. 16, 2025

Related U.S. Application Data

(62) Division of application No. 17/683,131, filed on Feb. 28, 2022.

(60) Provisional application No. 63/154,957, filed on Mar. 1, 2021.

(51) Int. Cl.
*A01N 47/34* (2006.01)
*A01N 25/04* (2006.01)
*A01N 25/26* (2006.01)
*A01P 7/04* (2006.01)

(52) U.S. Cl.
CPC ............ *A01N 47/34* (2013.01); *A01N 25/04* (2013.01); *A01N 25/26* (2013.01); *A01P 7/04* (2021.08)

(58) Field of Classification Search
None
See application file for complete search history.

(56) References Cited

U.S. PATENT DOCUMENTS 3,264,177 A 8/1966 Kenaga
5,886,221 A 3/1999 Sbragia et al.
10,492,489 B2 12/2019 Vadakekuttu et al.
2008/0206345 A1 8/2008 Guyon et al.
2010/0015236 A1 1/2010 Magdassi et al.
2010/0041552 A1 2/2010 Saxell
2019/0098893 A1 4/2019 Tanaka

FOREIGN PATENT DOCUMENTS

DE 2641343 A 4/1977
EP 210487 A 2/1987
EP 234045 B1 9/1987
EP 347488 A 12/1989
EP 528156 B1 2/1993
EP 647637 A 4/1995
WO 93/10083 A1 5/1993
WO 93/22297 A1 11/1993
WO 95/01971 1/1995
WO 96/16061 5/1996
WO 96/20196 7/1996
WO 96/25395 8/1996
WO 96/35664 11/1996
WO 97/01535 1/1997
WO 97/02243 1/1997
WO 97/36868 10/1997
WO 97/43275 11/1997
WO 98/05638 A2 2/1998
WO 98/06721 A1 2/1998
WO 99/16748 A1 4/1999
WO 99/43649 A1 9/1999
WO 99/48869 A1 9/1999
WO 99/55673 A1 11/1999

OTHER PUBLICATIONS

Hanson, B.; Bond, C.; Buhl, K.; Stone, D. May 2015. Pesticide Half-life Fact Sheet; National Pesticide Information Center, Oregon State University Extension Services. npic.orst.edu/factsheets/half-life.html. (Year: 2015).
Tudi M, Daniel Ruan H, Wang L, Lyu J, Sadler R, Connell D, Chu C, Phung OT. Agriculture Development, Pesticide Application and Its Impact on the Environment. IntJ Environ Res Public Health. Jan. 27, 2021;18(3):1112. doi: 10.3390/ijerph18031112. PMID: 33513796; PMCID: PMC7908628. (Year: 2021).
Wayback Machine. How Long Does a Pest Control Application Last?, (2022), Solutions Pest & Lawn. https://web.archive.org/web/20220916104119/https://www.solutionsstores.com/how-long-does-a-pest-control-application-last (Year: 2022).
May 27, 2022—International Search Report and Written Opinion, PCT/US2022/018212, 10 pages.

*Primary Examiner* — Bethany P Barham
*Assistant Examiner* — Afua Bamfoaa Boateng
(74) *Attorney, Agent, or Firm* — POLSINELLI PC

(57) ABSTRACT

Compositions and methods for controlling pests are disclosed. The compositions comprise a solid particulate chitin synthesis inhibitor and methods of using the chitin synthesis inhibitor to control a target pest. The chitin synthesis inhibitor is active in its solid form, and provides control of current and future pest generations independent of application timing with respect to insect life stage.

3 Claims, 8 Drawing Sheets

SOLID PARTICULATE PEST CONTROL COMPOSITIONS AND METHODS

CROSS-REFERENCE TO RELATED APPLICATIONS

This application is a divisional of U.S. patent application Ser. No. 17/683,131, filed Feb. 28, 2022, which claims priority to U.S. Provisional Application No. 63/154,957, filed Mar. 1, 2021, the entire contents of which are hereby incorporated by reference.

FIELD OF THE INVENTION

The present disclosure provides pesticidally active solid particulate chitin synthesis inhibitor compositions and methods of using the same to control a target pest.

BACKGROUND OF THE INVENTION

Pesticide resistance management is becoming increasingly challenging due to emergent wild-type resistance in pest populations. For example, the annual bluegrass weevil (ABW) is a serious pest of golf course turf. This pest is increasingly difficult to control due to multiple generations per growing season and increasing resistance to available insecticides. Chemical control programs for ABW typically require a carefully timed adulticide application followed by applications of insect growth regulators (IGRs) aimed at controlling larval stages over a three-month period. If satisfactory control of the first generation is not achieved, it becomes increasingly difficult to achieve due to overlapping life cycles as the season progresses. Control is further complicated due to varying efficacy of pesticide chemistries based on the targeted stage. In these populations, many pyrethroid-resistant populations have been confirmed and resistance to Stage 2 and Stage 3 approaches is increasingly suspected.

With pesticides such as IGRs, integrated pest management pesticide applications are highly timed to insect lifecycle stages because IGRs are typically applied to immature insects (larvae and nymphs) to cause mortality prior to the adult stage. This results in evolutionary selection pressure prior to adult mating, thus selecting for resistance. Resistant pests surviving and reaching the adult stage mate and pass on the resistant gene(s) to the subsequent generation.

Accordingly, for these and other reasons, there is a continuing need to provide effective pesticidal control.

SUMMARY OF THE INVENTION

One aspect of the present disclosure encompasses a pesticidal composition. The composition comprises a pesticidally effective concentration of a pesticidally active solid particulate chitin synthesis inhibitor. The size of particles of the solid particulate can be about 15 μm or less. The chitin synthesis inhibitor can be pesticidally active irrespective of the stage of development of the pest.

The chitin synthesis inhibitor can be a benzoylurea growth regulator. When the chitin synthesis inhibitor is a benzoylurea growth regulator, the chitin synthesis inhibitor can be novaluron, diflubenzuron, lufenuron, or combinations thereof. In some aspects, the composition comprises novaluron at a concentration of about 0.01% w/w or more.

The composition can be a powder composition comprising the solid particulate chitin synthesis inhibitor. The composition can further comprise a carrier granule having the powder composition deposited thereon. When the composition is a powder composition, the composition can comprise novaluron at a concentration ranging from about 0.08% w/w to about 0.7% w/w. The powder composition can also comprise diflubenzuron at a concentration ranging from about 0.1% w/w to about 0.5% w/w.

The composition can also be a suspension composition comprising the solid particulate chitin synthesis inhibitor. The composition can further comprise a carrier granule having the suspension composition deposited thereon. In some aspects, the suspension composition is an aqueous suspension composition, wherein the chitin synthesis inhibitor is not soluble in the aqueous solution. Further, the composition is generally free of a solvent that can solubilize the chitin synthesis inhibitor. The suspension composition can be a suspension concentrate. The suspension composition can further comprise a non-ionic surfactant. The non-ionic surfactant can be a siloxane-based non-ionic surfactant. The suspension composition can further comprise xanthan gum as a thickener/stabilizer. The composition can be a suspension concentrate.

In some aspects, the composition comprises novaluron at a concentration ranging from about 5% w/w to about 15% w/w. In other aspects, the suspension composition comprises novaluron at a concentration ranging from about 30% w/w to about 60% w/w. In additional aspects, the composition comprises diflubenzuron at a concentration ranging from about 8% w/w to about 16% w/w. In other aspects, the composition comprises diflubenzuron at a concentration ranging from about 17% w/w to about 27% w/w. In yet other aspects, the composition comprises lufenuron at a concentration ranging from about 15% w/w to about 25% w/w.

The target pest can be an adult pest. When the pest is an adult pest, the composition can reduce the fecundity of the adult pest. In some aspects, a target pest is an insect pest. For instance, the insect can be termites, roaches, or darkling beetles. When the insect is a darkling beetle, the composition can be a powder composition comprising about 0.08% w/w to about 0.7% w/w novaluron. When the insect is a bed bug, the composition can be an aqueous suspension composition comprising about 5% w/w to about 15% w/w novaluron.

In some aspects, the pest is a plant pest. The plant can be a turf plant. In some aspects, the plant pest is Annual Bluegrass Weevil (*Listronotus maculicollis*), Southern Chinch Bug (*Blissus insularis*), Common June Beetle (*Phyllophaga* spp.), or combinations thereof.

Another aspect of the present disclosure encompasses a pesticidal granule comprising a carrier granule having a pesticidal powder composition deposited thereon. The pesticidal powder composition can be as described above.

Yet another aspect of the present disclosure encompasses a pesticidal granule comprising a carrier granule having a pesticidal suspension composition deposited thereon. The pesticidal suspension composition can be as described above. In some aspects, the suspension composition is a suspension concentrate.

Another aspect of the present disclosure encompasses a suspension concentrate composition comprising about 5% w/w to about 15% w/w solid particulate novaluron; about 2% w/w to about 8% w/w siloxane-based non-ionic surfactant (Break-Thru S 233); about 0.2% w/w to about 0.8% w/w anti-foaming agent (Sag 30); about 10% w/w to about 20% w/w propylene glycol; about 0.1% w/w to about 0.5% w/w xanthan gum; about 0.1% w/w to about 0.5% w/w preservative (Proxel GXL); and about 60% w/w to about 80% w/w water.

An additional aspect of the present disclosure encompasses a suspension concentrate composition comprising about 20% w/w to about 30% w/w solid particulate novaluron; about 2% w/w to about 8% w/w siloxane-based non-ionic surfactant (Break-Thru S 233); about 0.2% w/w to about 0.8% w/w anti-foaming agent (Sag 30); about 10% w/w to about 20% w/w propylene glycol; about 0.1% w/w to about 0.5% w/w xanthan gum; about 0.1% w/w to about 0.5% w/w preservative (Proxel GXL); and about 45% w/w to about 65% w/w water.

Yet another aspect of the present disclosure encompasses a suspension concentrate composition comprising 30% w/w to about 50% w/w water; about 2% w/w to about 8% w/w siloxane-based non-ionic surfactant (Break-Thru S 233); about 1% w/w to about 2% w/w dispersant (Morwet D-425); about 0.2% w/w to about 0.8% w/w anti-foaming agent (Sag 30); about 30% w/w to about 60% w/w solid particulate novaluron; about 5% w/w to about 15% w/w propylene glycol; about 0.1% w/w to about 0.2% w/w xanthan gum; about 0.1% w/w to about 0.2% w/w attapulgite dispersion; and about 0.2% w/w to about 0.6% w/w preservative (Proxel GXL).

One aspect of the present disclosure encompasses a suspension concentrate composition comprising about 35% w/w to about 50% w/w water; about 2.5% w/w to about 6.5% w/w siloxane-based non-ionic surfactant (Break-Thru S 233); about 0.1% w/w to about 1% w/w anti-foaming agent (Sag 30); about 30% w/w to about 60% w/w solid particulate novaluron; about 5% w/w to about 15% w/w propylene glycol; about 0.1% w/w to about 0.5% w/w xanthan gum; and about 0.1% w/w to about 1% w/w preservative (Proxel GXL).

Another aspect of the present disclosure encompasses a suspension concentrate composition comprising about 35% w/w to about 50% w/w water; about 0.2% w/w to about 0.8% w/w wetting agent (Aerosol OT-B); about 0.75% w/w to about 1.75% w/w anionic tristyrylphenol phosphate surfactant (Soprophor FLK); about 1% w/w to about 5% w/w siloxane-based non-ionic surfactant (Break-Thru S 233); about 0.1% w/w to about 1% w/w anti-foaming agent (Sag 30); about 30% w/w to about 60% w/w solid particulate novaluron; about 5% w/w to about 15% w/w propylene glycol; about 0.1% w/w to about 0.5% w/w xanthan gum; and about 0.1% w/w to about 1% w/w preservative (Proxel GXL).

Yet another aspect of the present disclosure encompasses a suspension concentrate composition comprising about 35% w/w to about 50% w/w water; about 2.5% w/w to about 6.5% w/w siloxane-based non-ionic surfactant (Break-Thru S 233); about 0.1% w/w to about 1% w/w anti-foaming agent (Sag 30); about 30% w/w to about 60% w/w solid particulate novaluron; about 5% w/w to about 15% w/w propylene glycol; about 0.1% w/w to about 0.5% w/w xanthan gum; and about 0.1% w/w to about 1% w/w preservative (Proxel GXL).

An additional aspect of the present disclosure encompasses a suspension concentrate composition comprising about 35% w/w to about 50% w/w water; about 0.2% w/w to about 0.8% w/w wetting agent (Aerosol OT-B); about 0.75% w/w to about 1.75% w/w anionic tristyrylphenol phosphate surfactant (Soprophor FLK); about 1% w/w to about 5% w/w siloxane-based non-ionic surfactant (Break-Thru S 233); about 0.1% w/w to about 1% w/w anti-foaming agent (Sag 30); about 30% w/w to about 60% w/w solid particulate novaluron; about 5% w/w to about 15% w/w propylene glycol; about 0.1% w/w to about 0.5% w/w xanthan gum; and about 0.1% w/w to about 1% w/w preservative (Proxel GXL).

Another aspect of the present disclosure encompasses a suspension concentrate composition comprising about 10% w/w to about 15% w/w solid particulate diflubenzuron; about 1% w/w to about 5% w/w siloxane-based non-ionic surfactant (Break-Thru S 233); about 1% w/w to about 3% w/w non-ionic surfactant (Step-Flow 26 F); about 0.1% w/w to about 1% w/w anti-foaming agent (Sag 30); about 5% w/w to about 15% w/w propylene glycol; about 0.1% w/w to about 0.5% w/w xanthan gum; about 0.1% w/w to about 0.5% w/w preservative (Proxel GXL); and about 60% w/w to about 70% w/w water.

Yet another aspect of the present disclosure encompasses a suspension concentrate composition comprising about 15% w/w to about 25% w/w solid particulate lufenuron; about 1% w/w to about 5% w/w siloxane-based non-ionic surfactant (Break-Thru S 233); about 1% w/w to about 3% w/w non-ionic surfactant (Step-Flow 26 F); about 0.1% w/w to about 1% w/w anti-foaming agent (Sag 30); about 5% to about 15% w/w propylene glycol; about 0.1% w/w to about 0.5% w/w xanthan gum; about 0.1% w/w to about 0.5% w/w preservative (Proxel GXL); and about 60% w/w to about 70% w/w water.

In some aspects, the suspension composition is a suspension concentrate further comprising fertilizer granules having the suspension concentrate deposited thereon, wherein the chitin synthesis inhibitor is novaluron, and the chitin synthesis inhibitor granules comprise novaluron ranging from about 0.05% to about 5% novaluron by wt, from about 0.05% to about 4% novaluron by wt, from about 0.1% to about 1% novaluron by wt, or from about 0.2% to about 0.5% novaluron by wt.

Another aspect of the present disclosure encompasses a pesticidal granule comprising a pesticidal suspension composition deposited thereon. In some aspects, the chitin synthesis inhibitor is novaluron, and the granules comprise novaluron ranging from about 0.05% to about 5% novaluron by wt, from about 0.05% to about 4% novaluron by wt, from about 0.1% to about 1% novaluron by wt, or from about 0.2% to about 0.5% novaluron by wt.

Another aspect of the present disclosure encompasses a pesticidal powder composition comprising a solid particulate chitin synthesis inhibitor. In some aspects, the powder composition comprises about 0.08% w/w to about 0.5% w/w solid particulate novaluron; about 70% w/w to about 80% w/w attapulgite dispersion; and about 20% w/w to about 30% w/w corn grit 14/20.

In some aspects, the powder composition comprises about 0.08% w/w to about 0.5% w/w solid particulate novaluron; about 70% w/w to about 80% w/w brewer's yeast; about 20% w/w to about 30% w/w corn grit 14/20; and about 1% w/w to about 2% w/w crushed limestone.

In other aspects, the powder composition comprises about 0.08% w/w to about 0.5% w/w solid particulate novaluron, about 70% w/w to about 80% w/w brewer's yeast, about 20% w/w to about 30% w/w corn grit 14/20, and about 1% w/w to about 2% w/w crushed limestone.

One aspect of the present disclosure encompasses a pesticidal granule comprising a fertilizer granule having a pesticidal suspension composition deposited thereon, wherein the fertilizer granule comprises novaluron ranging from about 0.05% to about 5% novaluron by wt, from about 0.05% to about 4% novaluron by wt, from about 0.1% to about 1% novaluron by wt, or from about 0.2% to about 0.5% novaluron by wt.

Yet another aspect of the present disclosure encompasses a method of controlling a target pest, the method comprising contacting the pest with a pesticidally effective amount of a pesticidal composition described above. The pest can be contacted by applying a pesticidally effective amount of the composition to a site where control is sought. The pest can be contacted at any stage of development of the pest. The method can control current and future pest generations independent of application timing with respect to the life stage of the pest. The pest can be a plant pest, and the composition can be a suspension composition comprising the solid particulate chitin synthesis inhibitor.

In some aspects, the suspension composition is a suspension concentrate comprising about 30% w/w to about 50% w/w water, about 2% w/w to about 8% w/w siloxane-based non-ionic surfactant (Break-Thru S 233), about 1% w/w to about 2% w/w dispersant (Morwet D-425), about 0.2% w/w to about 0.8% w/w anti-foaming agent (Sag 30), about 30% w/w to about 60% w/w solid particulate novaluron, about 5% w/w to about 15% w/w propylene glycol, about 0.1% w/w to about 0.2% w/w xanthan gum, about 0.1% w/w to about 0.2% w/w attapulgite, and about 0.2% w/w to about 0.6% w/w preservative (Proxel GXL).

In some aspects, the suspension composition is a suspension concentrate comprising about 35% w/w to about 50% w/w water, about 2.5% w/w to about 6.5% w/w siloxane-based non-ionic surfactant (Break-Thru S 233), about 0.1% w/w to about 1% w/w anti-foaming agent (Sag 30), about 30% w/w to about 60% w/w solid particulate novaluron, about 5% w/w to about 15% w/w propylene glycol, about 0.1% w/w to about 0.5% w/w xanthan gum, and about 0.1% w/w to about 1% w/w preservative (Proxel GXL).

In some aspects, the suspension composition is a suspension concentrate comprising about 35% w/w to about 50% w/w water, about 0.2% w/w to about 0.8% w/w wetting agent (Aerosol OT-B), about 0.75% w/w to about 1.75% w/w anionic tristyrylphenol phosphate surfactant (Soprophor FLK), about 1% w/w to about 5% w/w siloxane-based non-ionic surfactant (Break-Thru S 233), about 0.1% w/w to about 1% w/w anti-foaming agent (Sag 30), about 30% w/w to about 60% w/w solid particulate novaluron, about 5% w/w to about 15% w/w propylene glycol, about 0.1% w/w to about 0.5% w/w xanthan gum, and about 0.1% w/w to about 1% w/w preservative (Proxel GXL).

The composition can be a pesticidal granule comprising a pesticidal suspension composition deposited thereon. When the composition is a pesticidal granule, the chitin synthesis inhibitor can be novaluron, and the granules can comprise novaluron ranging from about 0.05% to about 5% novaluron by wt, from about 0.05% to about 4% novaluron by wt, from about 0.1% to about 1% novaluron by wt, or from about 0.2% to about 0.5% novaluron by wt. In some aspects, the pesticidal granule is a fertilizer granule and the chitin synthesis inhibitor is novaluron, and wherein the pesticidal granule comprises novaluron ranging from about 0.05% to about 5% novaluron by wt, from about 0.05% to about 4% novaluron by wt, from about 0.1% to about 1% novaluron by wt, or from about 0.2% to about 0.5% novaluron by wt.

DETAILED DESCRIPTION

Figure 1:
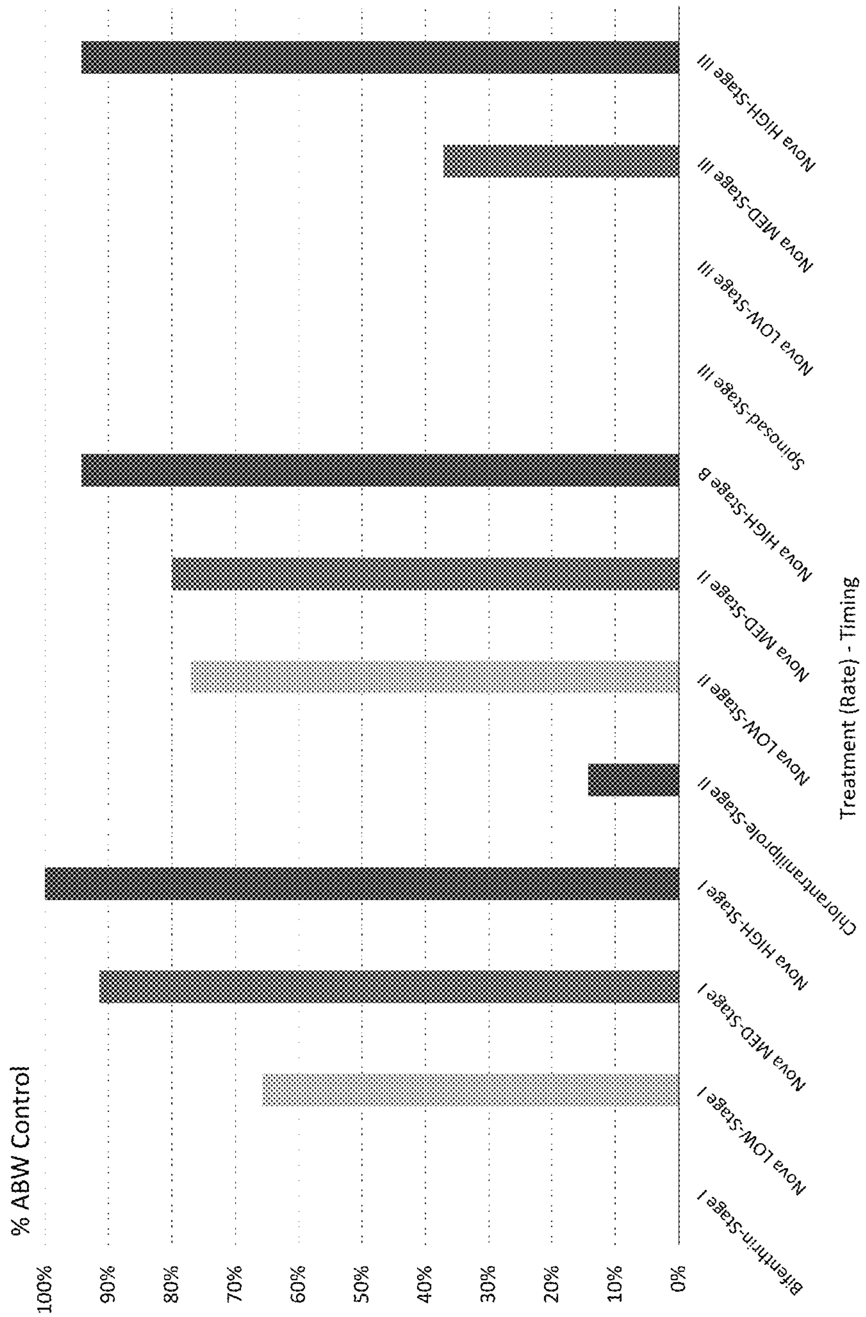
FIG. 1 is a plot showing 2020 annual bluegrass weevil (ABW) control with novaluron at three timings versus industry standards.
Figure 2:
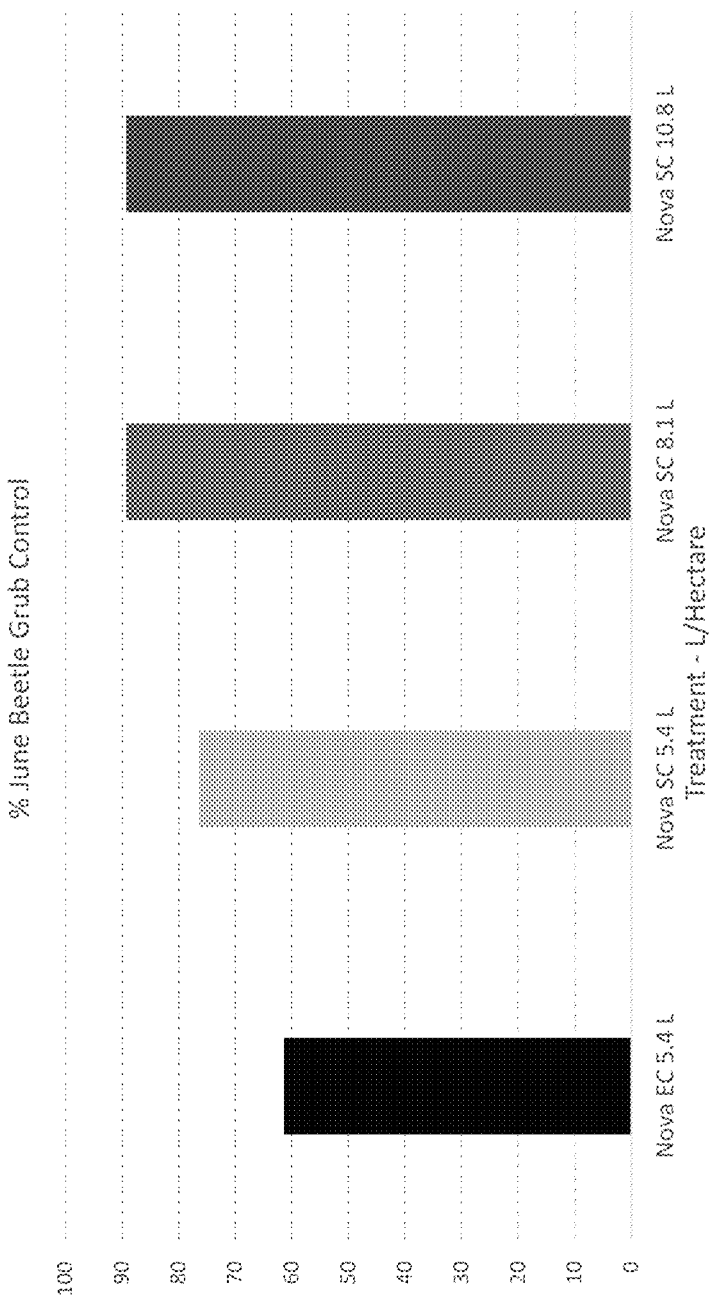
FIG. 2 is a plot showing 2020 June beetle grub control on golf course fairways across four sites.

The present disclosure is based in part on the discovery that insect growth regulators, when applied in the form of a solid particulate, have surprisingly and counter-intuitively exhibited pesticidal activity when compared to industry standard emulsifiable chitin synthesis inhibitor compositions. Also surprisingly, the inventors discovered that the solid particulate form of the chitin synthesis inhibitor provides control of current and future pest generations independent of application timing with respect to the life stage of the pest. Through extensive experimentation, the inventors discovered that chitin synthesis inhibitors, when in a solid particulate form, can function as an adulticide and as a fecundity reducer, in addition to the known function of chitin synthesis inhibitors in controlling pests during growth and development of the pest. Importantly, the ability to control current and future generations of pests independent of application timing with respect to the life stage of the pest greatly simplifies pest management programs, reduces the development of resistance to pesticides, and reducing fecundity further decreases the propagation of any pesticide-resistant traits already present in the adults by diminishing the size of the future generation.

I. COMPOSITIONS

One aspect of the present disclosure encompasses a pesticidal composition comprising a pesticidally effective concentration of a solid particulate insect growth regulator (IGR). In some aspects, the IGR is a chitin synthesis inhibitor. In some aspects, the chitin synthesis inhibitor is a benzoylurea chitin synthesis inhibitor. The pest can be an insect or a member of the arachnid subclass Acari, which includes ticks and mites.

As explained above, the inventors discovered that chitin synthesis inhibitors, when applied in the form of a solid particulate, can be used to effectively control a pest. As used herein, the terms "solid particulate chitin synthesis inhibitors," "chitin synthesis inhibitors in solid particulate form," and "solid particulate form of a chitin synthesis inhibitor," when they relate to a chitin synthesis inhibitor, can be used interchangeably and refer to a solid form of the active chitin synthesis inhibitor.

The size of chitin synthesis inhibitor particles can and will vary depending on the chitin synthesis inhibitor, the target pest to be controlled, the method of application, and the location in which the target pest is to be controlled, among other variables, provided the particles in the composition are of a size compatible with the intended composition and the intended method of application of the composition. For instance, if the composition is a powder composition intended for application into the environment of the pest, each particle in the powder composition is of a size appropriate to promote dispersability of the composition in the environment of the organism. Similarly, when the composition is a suspension composition, each particle in the suspension composition is of a size appropriate to promote and maintain dispersability of the composition in a suspending vehicle. In some aspects, the size of each particle comprising the chitin synthesis inhibitor can be about 100 μm or less, 50 μm or less, 25 μm or less, or 15 μm or less. In some aspects, the size of each particle comprising the chitin synthesis inhibitor is about 15 μm or less.

(a) Chitin Synthesis Inhibitors

An insect growth regulator (IGR) is a substance that inhibits the life cycle of an insect by interfering with the molting process. Before the instant invention, it was assumed that IGRs only function by preventing an insect from reaching maturity. IGRs suitable for the instant disclosure can be hormonal IGRs or chitin synthesis inhibitors.

In some aspects, the IGR is a chitin synthesis inhibitor. Chitin synthesis inhibitors prevent the formation of chitin, a carbohydrate needed to form the insect's exoskeleton. Chitin synthesis inhibitors may include a broad class of benzoylphenylurea, as disclosed in U.S. Pat. No. 5,886,221 (which is incorporated herein by reference in its entirety). Non-limiting examples of suitable benzoylureas include chlorfluazuron, cyramazin, diflubenzuron, noviflumuron, flucycloxuron, flufenoxuron, hexaflumuron, lufenuron, novaluron, teflubenzuron, diflubenzuron, triflumuron, buprofezin, diofenolan, hexythiazox, etoxazole, clofentazine, lufenuron, chlorfluazuron, bistrifluron, triflumuron, and combinations thereof. In some aspects, the chitin synthesis inhibitor is novaluron, diflubenzuron, lufenuron, or combinations thereof.

(b) Formulations

The compositions can be formulated for application as a suspension or as a solid to control pests, depending on the target pest to be controlled as well as the method used for controlling the pest. For instance, if the target pest is a termite, the composition can be formulated as a powder and can further comprise an environmentally mimicking agent that mimics or is compatible with the environment of the termite. Similarly, the pesticidally effective concentration of solid particulate chitin synthesis inhibitors in the composition can and will change depending on the target pest to be controlled as well as the intended use of the composition. In some aspects, chitin synthesis inhibitors of the instant disclosure can be formulated as a solid or as a suspension.

A. Solid Compositions

In some aspects, the compositions are formulated as a solid according to methods well known in the art. For instance, the compositions can be formulated as a powder, granules, or any other solid form suitable for delivery of a pesticide. In some aspects, the compositions are formulated as a powder. It will be recognized that powder compositions can further be compressed into other solid forms, including granules or blocks.

In some aspects, the composition is formulated into a powder comprising the solid particulate chitin synthesis inhibitor. Powder formulations are known in the art and generally comprise one or more of anticaking agents, dispersants and fillers, among other ingredients. Pesticidal powder compositions are generally applied as a dust to provide superior access to cracks and crevices that many insecticide sprays may miss for better overall pest control. Ingredients that may be used in powder formulations are described further below in this section and in Section I(c). It will be recognized that one or more of the components can exhibit more than one characteristic of the ingredients of the composition. For instance, when a composition of the disclosure comprises a clay ingredient, the clay can be an anticaking agent used to maintain the flowability of the composition, an environmentally mimicking agent for use as a building material by, e.g., termites, and a filler.

Powder compositions can also be applied onto a carrier such as carrier granules prior to application such as by broadcast distribution. Accordingly, one aspect of the present disclosure encompasses a pesticidal granule comprising a carrier granule having a powder composition of chitin synthesis inhibitors deposited thereon (chitin synthesis inhibitor granules). It will be recognized that a sufficient amount of the powder composition is deposited onto the carrier granules to provide a pesticidally effective concentration of the inhibitor. The pesticidally effective concentration can and will vary depending on the chitin synthesis inhibitor, the method of depositing the powder onto the carrier granules, the application rate of the carrier granules, the target pest to be controlled, and the site where control of a target pest is sought, and can be determined experimentally.

The powder composition can be deposited onto carrier granules by simply spraying onto or combining the powder composition with the carrier granules. Alternatively, the powder composition can be adhered to the carrier granules using a tackifying agent. A suitable carrier granule is any granule well sized for the method of distribution of the granules, such as by broadcast distribution. For instance, a carrier granule can have a size ranging from about 0.1 millimeter to about 5 centimeters, from about 0.5 to about 2 centimeters, or from about 0.1 to about 5 millimeters. The granules are generally inert towards the chitin synthesis inhibitor when applied thereon. Suitable carrier granules include fragmented materials such as rock dust, clay, corncob, cereal or grain hulls, peanut hulls, plant pulp, other plant-based cellulosic materials, clays, granular baits, and fertilizers. Non-limiting examples of carrier granules include: limestone particulate; fertilizer granules; and extruded corn granules. In some aspects, the carrier granules disintegrate after distribution. In some aspects, the carrier granules are dissolvable carrier granules. In some aspects, when the granule is a fertilizer granule and the chitin synthesis inhibitor is novaluron, the chitin synthesis inhibitor granules comprise novaluron ranging from about 0.05% to about 5% novaluron by wt, from about 0.05% to about 4% novaluron by wt, from about 0.1% to about 1% novaluron by wt, or from about 0.2% to about 0.5% novaluron by wt.

In some aspects, the powder composition comprises solid particulate novaluron. When the composition comprises solid particulate novaluron, the powder compositions can comprise novaluron at a concentration of about 0.01% w/w or more. For instance, the composition can comprise solid particulate novaluron at a concentration of about 0.01%, 0.1%, 1%, 10%, 20%, 30%, 40%, 50%, 60%, 70%, 80%, 90% w/w or more. In one aspect, the composition comprises solid particulate novaluron at a concentration of about 0.08% w/w or more. In one aspect, the pesticidal powder composition comprises about 0.08% w/w to about 0.5% w/w solid particulate novaluron; about 70% w/w to about 80% w/w attapulgite; and about 20% w/w to about 30% w/w corn grit 14/20.

In another aspect, the powder composition comprises solid particulate diflubenzuron. When the powder composition comprises solid particulate diflubenzuron, the dust compositions can comprise novaluron at a concentration of about 0.01% w/w or more. For instance, the composition can comprise solid particulate diflubenzuron at a concentration of about 0.01%, 0.1%, 1%, 10%, 20%, 30%, 40%, 50%, 60%, 70%, 80%, 90% w/w or more. In one aspect, the composition can comprise solid particulate diflubenzuron at a concentration of about 0.08% w/w or more. In one aspect, the pesticidal powder composition comprises about 0.08% w/w to about 0.5% w/w solid particulate novaluron; about 70% w/w to about 80% w/w brewer's yeast; about 20% w/w to about 30% w/w corn grit 14/20; and about 1% w/w to about 2% w/w crushed limestone.

i. Anticaking Agent

The compositions can comprise one or more anticaking agents. As used herein, the term "anticaking agent" is an additive placed in powdered or granulated materials to prevent the formation of lumps (caking) and for ease in packaging, transport, and flowability. Caking mechanisms depend on the nature of the material. Crystalline solids often cake by formation of liquid bridge and subsequent fusion of microcrystals. Amorphous materials can cake by glass transitions and changes in viscosity. Polymorphic phase transitions can also induce caking. The most widely used anticaking agents include the stearates of calcium and magnesium, silica and various silicates, talc, as well as flour and starch. Non-limiting examples of anticaking agents include tricalcium phosphate, crushed limestone, powdered cellulose, magnesium stearate, sodium bicarbonate, sodium ferrocyanide, potassium ferrocyanide, calcium ferrocyanide, bone phosphate (i.e., calcium phosphate), sodium silicate, silicon dioxide, calcium silicate, magnesium trisilicate, talcum powder, sodium aluminosilicate, potassium aluminium silicate, calcium aluminosilicate, bentonite, aluminium silicate, stearic acid, and polydimethylsiloxane. In some aspects, the anticaking agent is crushed limestone.

ii. Environmentally Mimicking Agent

The compositions can comprise one or more environmentally mimicking agents. As used herein, the term "environmentally mimicking agent" can be any powder ingredient that mimics, or is compatible with, the environment of a pest. The environmentally mimicking agent can be an edible ingredient. The environmentally mimicking agent can also be a building material. Additionally, the environmentally mimicking ingredient can mimic material normally found in the environment of the organism without necessarily being of use to the pest as food or building material. When the composition is a delayed acting composition, the environmentally mimicking agent is non-toxic, non-hydrophilic, and prevents desiccation and cuticle shredding exhibited by other, industrially common, environmentally mimicking agents such as carboxylated cellulose.

Non-limiting examples of suitable environmentally mimicking agents include powdered cellulosic materials, powdered clays including powdered attapulgite, powdered bentonite, powdered chitinous materials, powdered montmorillonite, powdered kaolinite, powdered vermiculite, powdered dolomite, calcium silicates, aluminum silicates, and combinations thereof.

iii. Filler

Any filler can be used provided the filler has not demonstrated repellant properties on target pest(s). Non-limiting examples of fillers include carbohydrates, inorganic compounds, inert non-food organic materials, crushed minerals, crushed non-perishable food or food-byproducts and biocompatible polymers, such as polyvinylpirrolydone (PVP). Other non-limiting examples of fillers include dibasic calcium sulfate, tribasic calcium sulfate, starch, calcium carbonate, magnesium carbonate, microcrystalline cellulose, dibasic calcium phosphate, tribasic calcium phosphate, magnesium carbonate, brewer's yeast, corn grit, powdered clays including powdered attapulgite, powdered bentonite, powdered chitinous materials, powdered montmorillonite, powdered kaolinite, powdered vermiculite, powdered dolomite, magnesium oxide, calcium silicate, talc, modified starches, saccharides such as sucrose, dextrose, lactose, microcrystalline cellulose, fructose, xylitol, and sorbitol, polyhydric alcohols; starches; pre-manufactured direct compression diluents; and mixtures of any of the foregoing. In some aspects, the filler is attapulgite.

B. Suspension Compositions

In some aspects, the composition is formulated as a suspension comprising the solid particulate chitin synthesis inhibitor according to methods well known in the art. As used herein, the term "suspension composition" refers to liquid compositions comprising solid particles of chitin synthesis inhibitor stably distributed somewhat uniformly throughout the suspending medium (suspending vehicle) in which the chitin synthesis inhibitor exhibits a minimum degree of solubility. Accordingly, a suspension composition of the instant disclosure is free of a solvent that can solubilize the chitin synthesis inhibitor. For instance, when the chitin synthesis inhibitor is a benzoylurea, the suspending vehicle is free of any organic solvent capable of solubilizing the benzoylurea.

Suspension compositions can be formulated as a liquid, gel, lotion, aerosol, foam, or cream composition containing, carriers, excipients, and vehicles as desired. Accordingly, in addition to a suspending vehicle, compositions can further comprise ingredients suitable for the intended formulation, including dispersants, stabilizers, surfactants, glidants, antifoaming agents, thickeners, antifreeze agents, solid carriers, chelating agents, antimicrobial agents, release-controlling polymers, and combinations of any thereof. As explained above, one or more of the components can exhibit more than one characteristic of the ingredients of the composition. For instance, when a composition of the disclosure comprises a clay ingredient, the clay can be a suspension aid or a dispersant.

The suspending vehicle can and will vary depending on the particular chitin synthesis inhibitor, the formulation, and the intended use of the composition. In some aspects, the suspending vehicle is an aqueous vehicle. In one aspect the suspending vehicle is water.

A suspension composition further comprises at least one surfactant. In some aspects, the surfactant is a non-ionic surfactant. The inventors surprisingly discovered that a suspension composition of the instant disclosure is significantly more pesticidally effective when the composition further comprises a non-ionic surfactant. In some aspects, the surfactant is a non-ionic siloxane or siloxane-based surfactant. Non-limiting examples of non-ionic siloxane-based surfactants include tri-siloxane surfactants having the general structure Me3SiO—SiMeR—OSiMe3 such as Break-Thru S 233, tristyrylphenol phosphate (Soprophor FLK), Step-Flow 26 F. In one aspect, the non-ionic surfactant is Break-Thru S 233. In one aspect, the surfactant is tristyrylphenol phosphate surfactant (Soprophor FLK).

In some aspects, the suspension composition is a suspension concentrate. As used herein, the term "suspension concentrate" refers to a concentrated form of the suspension composition, wherein the concentrate comprises all the ingredients of the composition in a concentrated form. Accordingly, a suspension concentrate is diluted to a pesticidally effective concentration of chitin synthesis inhibitor prior to application by, e.g., spraying the diluted concentrate. Accordingly, one aspect of the present disclosure encompasses a pesticidal composition comprising a suspension composition obtained from a suspension concentrate, wherein the chitin synthesis inhibitor is at a pesticidally effective concentration suitable for application of the inhibitor. The pesticidally effective concentration can and will vary depending on the chitin synthesis inhibitor, the method of application of the diluted concentrate, the application rate of the diluted concentrate, the target pest to be controlled, and the site where control of a target pest is sought, and can be determined experimentally.

The liquid used for diluting a suspension concentrate of the instant disclosure can and will vary depending on the chitin synthesis inhibitor, suspension concentrate, the method of application of the concentrate, the application rate of the diluted concentrate, the target pest to be controlled, and the site where control of a target pest is sought, and can be determined experimentally. In some aspects, the liquid is the same as the suspending vehicle of the suspension concentrate. For instance, when the suspending vehicle of a suspension concentrate is water, the suspension concentrate can further be diluted into water before application.

Suspension compositions can also be applied onto a carrier such as carrier granules prior to application such as by broadcast distribution. Accordingly, one aspect of the present disclosure encompasses a pesticidal granule comprising a carrier granule having a suspension composition of chitin synthesis inhibitors deposited thereon (chitin synthesis inhibitor granules). In some aspects, the suspension composition deposited onto the carrier granule is a suspension concentrate. In some aspects, the suspension composition deposited onto the carrier granule is a suspension composition diluted from a suspension concentrate.

It will be recognized that a sufficient amount of the suspension composition is deposited onto the carrier granules to provide a pesticidally effective concentration of the inhibitor. The pesticidally effective concentration can and will vary depending on the chitin synthesis inhibitor, the suspension concentrate, the method of depositing the concentrate onto the carrier granules, the application rate of the carrier granules, the target pest to be controlled, and the site where control of a target pest is sought, and can be determined experimentally.

The chitin synthesis inhibitor suspension can be deposited onto carrier granules by simply spraying onto or combining the suspension concentrate with the carrier granules. Alternatively, the chitin synthesis inhibitor can be adhered to the carrier granules using a tackifying agent. A suitable carrier granule is any granule well sized for the method of distribution of the granules, such as by broadcast distribution. For instance, a carrier granule can have a size ranging from about 0.1 millimeter to about 5 centimeters, from about 0.5 to about 2 centimeters, or from about 0.1 to about 5 millimeters. The granules are generally inert towards the suspension concentrate when applied thereon. Suitable carrier granules include fragmented materials such as rock dust, clay, corncob, cereal or grain hulls, peanut hulls, plant pulp, other plant-based cellulosic materials, clays, granular baits, and fertilizers. Non-limiting examples of carrier granules include: limestone particulate; fertilizer granules; and extruded corn granules. In some aspects, the carrier granules disintegrate after distribution. In some aspects, the carrier granules are dissolvable carrier granules. In some aspects, the carrier granules are a fertilizer particle wherein the suspension composition is sprayed thereon for co-application of the fertilizer and chitin synthesis inhibitor. In some aspects, when the granule is a fertilizer granule and the chitin synthesis inhibitor is novaluron, the chitin synthesis inhibitor granules comprise novaluron ranging from about 0.05% to about 5% novaluron by wt, from about 0.05% to about 4% novaluron by wt, from about 0.1% to about 1% novaluron by wt, or from about 0.2% to about 0.5% novaluron by wt.

In some aspects, the suspension composition comprises solid particulate novaluron. In some aspects, the suspension is a suspension concentrate comprising solid particulate novaluron. The suspension concentrate can comprise novaluron in a concentration ranging from about 0.001% w/w to about 80% w/w or more, from about 0.01% w/w to about 10% w/w, from about 0.05% w/w to about 1% w/w, or from about 0.08% w/w to about 0.7% w/w. In some aspects, the suspension concentrate comprises novaluron at a concentration ranging from about 0.01% w/w to about 80% w/w, from about 1% w/w to about 50% w/w, from about 30% w/w to about 60% w/w, or from about 5% w/w to about 15% w/w. In some aspects, the suspension concentrate comprises novaluron at a concentration ranging from about 5% w/w to about 15% w/w. In some aspects, the suspension concentrate comprises novaluron at a concentration ranging from about 30% w/w to about 60% w/w, or from about 35% w/w to about 55% w/w.

In some aspects, the suspension composition comprises solid particulate diflubenzuron. In some aspects, the suspension is a suspension concentrate comprising solid particulate diflubenzuron. When the chitin synthesis inhibitor is diflubenzuron, the suspension concentrate can comprise diflubenzuron at a concentration ranging from about 0.001% w/w to about 80% w/w, from about 1% w/w to about 50% w/w, from about 8% w/w to about 16% w/w, or from about 17% w/w to about 27% w/w. In some aspects, the suspension concentrate comprises diflubenzuron at a concentration ranging from about 8% w/w to about 16% w/w. In some aspects, the suspension concentrate comprises diflubenzuron at a concentration ranging from about 17% w/w to about 27% w/w.

In some aspects, the suspension composition comprises solid particulate lufenuron. In some aspects, the suspension is a suspension concentrate comprising solid particulate lufenuron. When the chitin synthesis inhibitor is lufenuron, the suspension concentrate can comprise lufenuron at a concentration ranging from about 0.001% w/w to about 80% w/w, from about 1% w/w to about 50% w/w, from about 10% w/w to about 80% w/w, or from about 15% w/w to about 25% w/w. In some aspects, the suspension concentrate comprises lufenuron at a concentration ranging from about 15% w/w to about 25% w/w.

i. Surfactant

The surfactant can be anionic, cationic surfactants, zwitterionic surfactants, and non-ionic surfactants. Anionic surfactants can be sulfate, sulfonate, and phosphate, carboxylate derivatives. Non-limiting examples of anionic surfactants include ammonium lauryl sulfate, sodium lauryl sulfate (sodium dodecyl sulfate, SLS, or SDS), and the related alkyl-ether sulfates sodium laureth sulfate (sodium lauryl ether sulfate or SLES), and sodium myreth sulfate, (dioctyl docusate sodium sulfosuccinate), perfluorooctanesulfonate (PFOS), perfluorobutanesulfonate, alkyl-aryl ether phosphates, alkyl ether phosphates, sodium stearate, sodium lauroyl sarcosinate and carboxylate-based fluorosurfactants such as perfluorononanoate, and perfluorooctanoate (PFOA or PFO). Non-limiting examples of cationic surfactants include octenidine dihydrochloride, cetrimonium bromide (CTAB), cetylpyridinium chloride (CPC), benzalkonium chloride (BAC), benzethonium chloride (BZT), dimethyldioctadecylammonium chloride, and dioctadecyldimethylammonium bromide (DODAB). Non-limiting examples of zwitterionic surfactants include CHAPS (3-[(3-cholamidopropyl)dimethylammonio]-1-propanesulfonate), lauryldimethylamine oxide, and myristamine oxide. Suitable nonionic surfactants include emulsifying wax, glyceryl monooleate, polyoxyethylene alkyl ethers, polyoxyethylene castor oil derivatives, polysorbate, sorbitan esters, benzyl alcohol, benzyl benzoate, cyclodextrins, glycerin monostearate, poloxamer, povidone and combinations thereof. In one embodiment, the non-ionic surfactant is stearyl alcohol. Non-limiting examples of non-ionic surfactants include octaethylene glycol monododecyl ether, pentaethylene glycol monododecyl ether, nonoxynols, Triton X-100, polyethoxylated tallow amine, cocamide monoethanolamine, cocamide diethanolamine, polaxamers, glycerol monostearate, glycerol monolaurate, sorbitan monolaurate, sorbitan monostearate, sorbitan tristearate, Tween 20, Tween 40, Tween 60, Tween 80, decyl glucoside, lauryl glucoside, octyl glucoside, siloxane surfactants, and combinations thereof.

ii. Suspension Aid

A suspension aid can be added to help maintain the solid particulate chitin synthesis inhibitor in suspension, thus improving the particle's resistance to settle statically and flow under shear or rheological shear-thinning. Suitable suspension aids include, but are not limited to, water soluble polymers such as 3-butoxy-2-hydroxypropylhydroxyethylcellulose, acrylamide homo- and copolymers, acrylic acid homo- and copolymer, alginates, carboxymethylcellulose (sodium and other salts), carboxymethylhydroxyethylcellulose, carboxy-vinyl copolymers, cellulose, guar gum, gum arabic; hydrophobically modified hydroxyethylcellulose, hydroxyethylcellulose, hydroxypropyl guar, hydroxypropyl methylcellulose, hydroxypropylcellulose, natural gums and their derivatives, partially and fully hydrolyzed polyvinyl alcohols, partially neutralized polyacrylic acid, polyalkylene glycol, polysaccharide gums, polyvinylpyrrolidone and derivatives, sodium carboxymethylcellulose, starch and its derivatives, vinylpyrrolidone homo- and copolymers, water-soluble cellulose ethers, xanthan gum, and mixtures thereof. Other suspension aids can be silica powder prepared by precipitating water glass (sodium silicate) with sulfuric acid, which is then dried and sold as a fine powder. The silica powder provides a rheology control and aids in suspension by preventing particle settling. Still another suspension aid material can be fumed alumina. Alumina or aluminium oxide is an amphoteric oxide of aluminium with the chemical formula AL2O3. Fumed alumina is made of primary particles which sinter together to form aggregates. These alumina aggregates have a chain-like structure and an average diameter of 150 nm (for primary particle size of 20 nm). It also provides a rheology control and lubrication for the particle suspension. Clays can also be used as suspension aids. Such clays include bentonite, laponites, kaolinite, dickite, and nacrite, with the general formula of Al2Si2O5 (OH)4; pyrophylite, talc, vermiculite, sauconite, saponte, nontronite, and montmorillonite with the general chemical formula (Ca, Na, H) (Al, Mg, Fe, Zn)2 (Si, Al)4O10(OH) 2·xH2O; attapulgite with the chemical general formula Mg5Si8O20(HO)2(OH2)4·4H2O; and illite with the general formula (K, H) Al2(Si, Al)4O10(OH)2·xH2O, and organically modified montmorillonite clays.

iii. Dispersant

The dispersant, in combination with at least one surfactant (described below), stabilizes the resulting aqueous formulation by lowering the surface tension and preventing agglomeration of the spore particles.

The dispersant can be ionic or non-ionic and polymeric in structure. Ionic water soluble polymers include lignin-based dispersants such as lignin sulfonates, which are water soluble polymers that carry ionic charge along the backbone chain, including ammonium, sodium, calcium and magnesium ions.

iv. Anti-Foaming Agent

An anti-foaming agent or a defoamer is a chemical additive that reduces and hinders the formation of foam in industrial process liquids. The terms anti-foam agent and defoamer are often used interchangeably. Strictly speaking, defoamers eliminate existing foam, and anti-foamers prevent the formation of further foam. Commonly used agents are insoluble oils, polydimethylsiloxanes and other silicones, certain alcohols, stearates and glycols. The additive is used to prevent formation of foam or is added to break a foam already formed. Oil-based defoamers have an oil carrier. The oil might be mineral oil, vegetable oil, white oil, or any other oil that is insoluble in the foaming medium, except silicone oil. An oil-based defoamer can also contain a wax and/or hydrophobic silica to boost the performance. Typical waxes are ethylene bis stearamide (EBS), paraffin waxes, ester waxes, and fatty alcohol waxes. These products might also have surfactants to improve emulsification and spreading in the foaming medium. Powder defoamers are in principle oil-based defoamers on a particulate carrier like silica. Water-based defoamers are different types of oils and waxes dispersed in a water base. The oils are often mineral oil or vegetable oils and the waxes are long chain fatty alcohol, fatty acid soaps, or esters. Silicone-based defoamers are polymers with silicon backbones. These might be delivered as an oil or a water-based emulsion. The silicone compound consists of a hydrophobic silica dispersed in a silicone oil. Emulsifiers are added to ensure that the silicone spreads fast and well in the foaming medium. The silicone compound might also contain silicone glycols and other modified silicone fluids. These are also heavy duty defoamers and are good at both knocking down surface foam and releasing entrained air. Silicone-based defoamers are also suitable in non-aqueous foaming systems like crude oil and oil refining. For very demanding applications, fluorosilicones may be suitable. EO/PO based defoamers contain polyethylene glycol and polypropylene glycol copolymers. They are delivered as oils, water solutions, or water-based emulsions. EO/PO copolymers normally have good dispersing properties and are often well suited when deposit problems are an issue. Alkyl polyacrylates are suitable for use as defoamers in non-aqueous systems where air release is more important than the breakdown of surface foam. These defoamers are often delivered in a solvent carrier like petroleum distillates. In some aspects, the anti-foaming agent is a silicone-based anti-foaming agent such as Sag 30.

v. Antifreeze Agents

Any substance capable of lowering the freezing point of water and protecting a system from the ill effects of ice formation can be used in the instant disclosure, provided the antifreeze is compatible with the compositions of the disclosure. Non-limiting examples of antifreezes include ethylene glycol or propylene glycol, methanol, isopropanol, glycerol, dimethyl sulfoxide, trehalose, and combinations thereof.

(c) Other Ingredients

Other ingredients that may be used in compositions of the instant disclosure include diluents, preservatives, chelating agents, and antimicrobial agents, among others. These ingredients are described in greater detail below.

A. Pesticidal Ingredient

The composition can comprise one or more pesticides in addition to the solid particulate chitin synthesis inhibitor. The additional component can be in the particles or it can be in the composition, it can be solid or not, depending on the function of the pesticide.

Pesticides are defined as chemicals used to kill pests. Pesticides include insecticides and acaricides. The pesticides can be ingestion-active or systemic pesticides. Alternatively, the pesticides can be contact pesticides. Pesticides can be ovicides or substances that kill eggs, larvicides or substances that kill larvae, or adulticides or substances that kill adult insects. Several types of pesticides are described in more detail below.

Irrespective of the type of pesticide, the pesticide and the concentration of the pesticide must be appropriate for the desired activity of the composition. For instance, when a composition is a delayed acting composition for translocation into a colony or to be shared among pests in the environment of the pest, the type and amount of pesticides in the composition must allow sufficient activity latency to facilitate translocation of the composition to other pests. Delayed activity can be inherent to the pesticide. Alternatively, the delayed activity can be controlled by the concentration of the pesticide in the composition. As such, the concentration of a pesticide in a composition of the disclosure can and will vary depending on the pesticide, the target pest among others, and can be determined experimentally for each pesticide.

i. Insecticides

An insecticide is a pesticide used against insects in all developmental forms. Insecticides are commonly used in agriculture, medicine, industry, and for household use. Representative insecticides useful in the present invention include pyrethrum type insecticides, such as pyrethrin; pyrethroids, such as deltamethrin, permethrin, β-cyfluthrin, bifenthrin, and resmethrin; nicotinics, particularly chloronicotinyl compounds, such as acetamiprid, imidacloprid, thiamethoxam, clothianidin, acetamiprid, thiacloprid, and dinotefuran; pyrazoles such as fipronil, ethiprole, and tebufenpyrad; semicarbazones such as indoxacarb and metaflumizone, phthalic acid diamides such as flubendiamide and (S)-3-chloro-N1-{2-methyl-4-[1,2,2,2-tetrafluoro-1-(trifluoromethyl)ethyl]phenyl}-N2-(1-methyl-2-methylsulfonylethyl)phthalamide; anthranilic acid amides such as chloroanthraniliprole; organophosphates such as chlorpyrifos, malathion, and diazinon; carbamates such as bendiocarb, carbaryl, and thiodicarb; ketoenoles such as spirotetramat, spirodiclofen, and spiromesifen; phthalic acid diamides such as insecticides with an active ingredients from the anthranilic diamide class such as that sold by DuPont under the tradename Rynaxypyr (hereinafter referred to a rynaxypyr for ease of reference), and flubendiamide; IGRs such as methoprene, pyriproxifen, triflumuron, hexaflumuron, noviflumuron, fenoxycarb; and other insecticides, such as abamectin, hydramethylnon, sulfluramid, and spinosad. Representative chlorinated hydrocarbons include aldrin, chlordane, chlordecone, DDT, dieldrin, endosulfan, endrin, heptachlor, hexachlorocyclohexane, gamma-hexachlorocyclohexane, lindane, methoxychlor, mirex, pentachlorophenol, and TDE. Representative organophosphorus insecticides include acephate, azinphos-methyl, bensulide, chlorethoxyfos, chlorpyrifos, chlorpyriphosmethylm diazinon, dichlorvos (DDVP), dicrotophos, dimethoate, disulfoton, ethoprop, fenamiphos, fenitrothion, fenthion, fosthiazate, malathion, methamidophos, methidathion, methyl-parathion, mevinphos, naled, omethoate, oxydemeton-methyl, parathion, phorate, phosalone, phosmet, phostebupirim, pirimiphos-methyl, profenofos, terbufos, tetrachlorvinphos, tribufos, trichlorfon. Representative carbamates include aldicarb, carbofuran, carbaryl, methomyl, and 2-(1-methylpropyl)phenyl methylcarbamate. Representative pyrethroids include allethrin, beta-cyfluthrin, bifenthrin, cyfluthrin, deltamethrin, permethrin, resmethrin, sumithrin, tetramethrin, tralomethrin, and transfluthrin. Representative plant toxin derived insecticides include derris (rotenone), pyrethrum, neem (azadirachtin), nicotine, caffeine, and compositions thereof.

Additional insecticides include cyclic ketoenols with insecticidal and acaricidal properties, such as those described in EP 528 156 A, WO 95/01971, EP 647 637 A, WO 96/16061, WO 96/20196, WO 96/25395, WO 96/35664, WO 97/02243, WO 97/01535, WO 97/36868, WO 97/43275, WO 98/05638, WO 98/06721, WO 99/16748, WO 99/43649, WO 99/48869, and WO 99/55673, each hereby incorporated by reference with regard to such teaching.

Certain pesticides are exempt from the requirements of the FIFRA act (40 CFR 152.25(f)). They are commonly known as minimum risk pesticides. Examples of these pesticides include castor oil (U.S.P. or equivalent), cedar oil, cinnamon and cinnamon oil, citric acid, citronella and citronella oil, cloves and clove oil, corn gluten meal, corn oil, cottonseed oil, dried blood, eugenol, garlic and garlic oil, geraniol, geranium oil, lauryl sulfate, lemongrass oil, linseed oil, malic acid, mint and mint oil, peppermint and peppermint oil, 2-phenethyl propionate (2-phenylethyl propionate), potassium sorbate, putrescent whole egg solids, rosemary and rosemary oil, sesame (includes ground sesame plant) and sesame oil, sodium chloride (table salt), sodium lauryl sulfate, soybean oil, thyme and thyme oil, and white pepper.

Numerous heterocycles, organotin compounds, benzoylureas and pyrethroids have insecticidal and acaricidal properties, for example, see WO 93/22297, WO 93/10083, DE 2 641 343 A, EP 347 488 A, EP 210 487 A, U.S. Pat. No. 3,264,177, and EP 234 045 A, each herein incorporated by reference with regard to such teaching.

Certain bacteria, fungi, and other biological material may be active as insecticides. When these biological insecticides are inactive against other organisms, some are considered more environmentally friendly than synthetic pesticides. Examples include, but are not limited to, *Bacillus sphericus, Bacillus subtilis, Bacillus cereus*, or combinations of such material.

In some aspects, the pesticide is abamectin, acetamiprid, borax (sodium tetraborate), boric acid, boron sodium oxide, chlorantranaliprole, cyantranaliprole, chlorfenapyr, copper ammonium carbonate, copper carbonate, basic, copper hydroxide, copper quinolate, cupric oxide, diflubenzuron, dinotefuran, fipronil, hexaflumuron, hydramethylnon, imidacloprid, indoxacarb, novaluron, noviflumuron, pyriproxyfen, sodium borate pentahydrate, tebuconazole, thiamethoxam, or combinations thereof. In some aspects, the pesticide is fipronil, indoxacarb, novaluron, pyriproxyfen, chlorfenapyr, or combinations thereof.

ii. Acaricides

Any suitable acaracide can be used. Examples of suitable acaricides include sumiito (2-tert-butyl-5-(4-tert-butylbenzylthio)-4-chloropyridazine-3-(2H)-one), acricid (2,4-dinitro-6-sec-butylphenyldimethylacrylate), chloromite (isopropyl 4,4-dichlorobenzylate), Akar (ethyl 4,4'-dichlorobenzilate), kelthane (2,2,2trichloro-1,1-bis(p-chlorophenyl)-ethanol), citrazon (benzoic 3-chloro-N-ethoxy-2,6-dimethoxybenzimidic anhydride), omite (2-(p-tert-butylphenoxy)cyclohexyl propyn-2-yl sulfite), osadan (bis[tris(2-methyl-2-phenylpropyl)tin]oxide), hexythiazox (trans-5-(4-chlorophenyl)-N-cyclohexyl-4-methyl-2-oxothiazol-idine-3-carboxamide), and amitraz (N,N-bis(2,4-xylyliminomethyl)methylamine).

B. Preservatives

Non-limiting examples of preservatives include, but are not limited to, ascorbic acid and its salts, ascorbyl palmitate, ascorbyl stearate, anoxomer, N-acetylcysteine, benzyl isothiocyanate, m-aminobenzoic acid, o-aminobenzoic acid, p-aminobenzoic acid (PABA), butylated hydroxyanisole (BHA), butylated hydroxytoluene (BHT), caffeic acid, canthaxantin, alpha-carotene, beta-carotene, beta-caraotene, beta-apo-carotenoic acid, carnosol, carvacrol, catechins, cetyl gallate, chlorogenic acid, citric acid and its salts, clove extract, coffee bean extract, p-coumaric acid, 3,4-dihydroxybenzoic acid, N,N'-diphenyl-p-phenylenediamine (DPPD), dilauryl thiodipropionate, distearyl thiodipropionate, 2,6-di-tert-butylphenol, dodecyl gallate, edetic acid, ellagic acid, erythorbic acid, sodium erythorbate, esculetin, esculin, 6-ethoxy-1,2-dihydro-2,2,4-trimethylquinoline, ethyl gallate, ethyl maltol, ethylenediaminetetraacetic acid (EDTA), eucalyptus extract, eugenol, ferulic acid, flavonoids (e.g., catechin, epicatechin, epicatechin gallate, epigallocatechin (EGC), epigallocatechin gallate (EGCG), polyphenol epigallocatechin-3-gallate), flavones (e.g., apigenin, chrysin, luteolin), flavonols (e.g., datiscetin, myricetin, daemfero), flavanones, fraxetin, fumaric acid, gallic acid, gentian extract, gluconic acid, glycine, gum guaiacum, hesperetin, alpha-hydroxybenzyl phosphinic acid, hydroxycinammic acid, hydroxyglutaric acid, hydroquinone, N-hydroxysuccinic acid, hydroxytryrosol, hydroxyurea, rice bran extract, lactic acid and its salts, lecithin, lecithin citrate; R-alpha-lipoic acid, lutein, lycopene, malic acid, maltol, 5-methoxy tryptamine, methyl gallate, monoglyceride citrate; monoisopropyl citrate; morin, beta-naphthoflavone, nordihydroguaiaretic acid (NDGA), octyl gallate, oxalic acid, palmityl citrate, phenothiazine, phosphatidylcholine, phosphoric acid, phosphates, phytic acid, phytylubichromel, pimento extract, propyl gallate, polyphosphates, quercetin, trans-resveratrol, rosemary extract, rosmarinic acid, sage extract, sesamol, silymarin, sinapic acid, succinic acid, stearyl citrate, syringic acid, tartaric acid, thymol, tocopherols (i.e., alpha-, beta-, gamma- and delta-tocopherol), tocotrienols (i.e., alpha-, beta-, gamma- and delta-tocotrienols), tyrosol, vanilic acid, 2,6-di-tert-butyl-4-hydroxymethylphenol (i.e., Ionox 100), 2,4-(tris-3',5'-bi-tert-butyl-4'-hydroxybenzyl)-mesitylene (i.e., Ionox 330), 2,4,5-trihydroxybutyrophenone, ubiquinone, tertiary butyl hydroquinone (TBHQ), thiodipropionic acid, trihydroxy butyrophenone, tryptamine, tyramine, uric acid, vitamin K and derivates, vitamin Q10, wheat germ oil, zeaxanthin, or combinations thereof.

C. Chelating Agents

A chelating agent may be included as an excipient to immobilize oxidative groups, including but not limited to metal ions, in order to inhibit the oxidative degradation of the morphinan by these oxidative groups. Non-limiting examples of chelating agents include lysine, methionine, glycine, gluconate, polysaccharides, glutamate, aspartate, and disodium ethylenediaminetetraacetate (Na2EDTA).

D. Antimicrobial Agents

An antimicrobial agent may be included as an excipient to minimize the degradation of the compound according to this disclosure by microbial agents, including but not limited to, bacteria and fungi. Non-limiting examples of antimicrobials include parabens, chlorobutanol, phenol, calcium propionate, sodium nitrate, sodium nitrite, Na2EDTA, and sulfites including but not limited to sulfur dioxide, sodium bisulfite, and potassium hydrogen sulfite.

E. Coloring Agents

Coloring agents can be included in the composition. Suitable color additives include, but are not limited to, food, drug and cosmetic colors (FD&C), drug and cosmetic colors (D&C), external drug and cosmetic colors (Ext. D&C), or fluorescent dyes.

F. Attractant

The term "attractant," as employed herein, refers to any substance which a pest will find appealing as a food item such that it will tend to transport it back to the nest, and expressly includes foods, baits, attractants and feeding stimulants, as well as combinations thereof.

Suitable ingredients can be an ingredient perceived as a food by the pest. The food attractant can and will vary depending on the pest, the method of using the composition, and the intended use of the composition. For instance, when the pest is a termite, non-limiting examples of a food attractant can be brown rot derivatives, scorched cellulosic material, edible fungus derivatives, and long-chain fatty acids. When the pest is a roach, non-limiting examples of a food attractant can be brewer's yeast, corn grit, sugar, gelatin, powdered organ meats, powdered cheese, brown rot derivatives, scorched cellulosic material, edible fungus derivatives, and long-chain fatty acids.

Alternatively, the attractant can be a non-edible attractant. For instance, a suitable attractant can be semiochemicals that mimic pest attraction systems found in nature. Non-limiting examples of semiochemicals include pheromones, plant volatiles, flower oils, sugars, and proteins.

(d) Specific Compositions

One aspect of the present disclosure encompasses a pesticidal suspension composition comprising a solid particulate chitin synthesis inhibitor. In some aspects, the suspension composition is a suspension concentrate.

In some aspects, the suspension concentrate composition is a suspension concentrate comprising about 5% w/w to about 15% w/w solid particulate novaluron; about 2% w/w to about 8% w/w siloxane-based non-ionic surfactant (Break-Thru S 233); about 0.2% w/w to about 0.8% w/w anti-foaming agent (Sag 30); about 10% w/w to about 20% w/w propylene glycol; about 0.1% w/w to about 0.5% w/w xanthan gum; about 0.1% w/w to about 0.5% w/w preservative (Proxel GXL); and about 60% w/w to about 80% w/w water.

In some aspects, the suspension concentrate composition is a suspension concentrate comprising about 20% w/w to about 30% w/w solid particulate novaluron; about 2% w/w to about 8% w/w siloxane-based non-ionic surfactant (Break-Thru S 233); about 0.2% w/w to about 0.8% w/w anti-foaming agent (Sag 30); about 10% w/w to about 20% w/w propylene glycol; about 0.1% w/w to about 0.5% w/w xanthan gum; about 0.1% w/w to about 0.5% w/w preservative (Proxel GXL); and about 45% w/w to about 65% w/w water.

In some aspects, the suspension concentrate composition is a suspension concentrate comprising about 30% w/w to about 50% w/w water; about 2% w/w to about 8% w/w siloxane-based non-ionic surfactant (Break-Thru S 233); about 1% w/w to about 2% w/w dispersant (Morwet D-425); about 0.2% w/w to about 0.8% w/w anti-foaming agent (Sag 30); about 30% w/w to about 60% w/w solid particulate novaluron; about 5% w/w to about 15% w/w propylene glycol; about 0.1% w/w to about 0.2% w/w xanthan gum; about 0.1% w/w to about 0.2% w/w attapulgite dispersion; and about 0.2% w/w to about 0.6% w/w preservative (Proxel GXL).

In some aspects, the suspension concentrate composition is a suspension concentrate comprising about 35% w/w to about 50% w/w water; about 2.5% w/w to about 6.5% w/w siloxane-based non-ionic surfactant (Break-Thru S 233); about 0.1% w/w to about 1% w/w anti-foaming agent (Sag 30); about 30% w/w to about 60% w/w solid particulate novaluron; about 5% w/w to about 15% w/w propylene glycol; about 0.1% w/w to about 0.5% w/w xanthan gum; and about 0.1% w/w to about 1% w/w preservative (Proxel GXL).

In some aspects, the suspension concentrate composition is a suspension concentrate comprising about 35% w/w to about 50% w/w water; about 0.2% w/w to about 0.8% w/w wetting agent (Aerosol OT-B); about 0.75% w/w to about 1.75% w/w anionic tristyrylphenol phosphate surfactant (Soprophor FLK); about 1% w/w to about 5% w/w siloxane-based non-ionic surfactant (Break-Thru S 233); about 0.1% w/w to about 1% w/w anti-foaming agent (Sag 30); about 30% w/w to about 60% w/w solid particulate novaluron; about 5% w/w to about 15% w/w propylene glycol; about 0.1% w/w to about 0.5% w/w xanthan gum; and about 0.1% w/w to about 1% w/w preservative (Proxel GXL).

In some aspects, the suspension concentrate composition is a suspension concentrate comprising about 35% w/w to about 50% w/w water; about 2.5% w/w to about 6.5% w/w siloxane-based non-ionic surfactant (Break-Thru S 233); about 0.1% w/w to about 1% w/w anti-foaming agent (Sag 30); about 30% w/w to about 60% w/w solid particulate novaluron; about 5% w/w to about 15% w/w propylene glycol; about 0.1% w/w to about 0.5% w/w xanthan gum; and about 0.1% w/w to about 1% w/w preservative (Proxel GXL).

In some aspects, the suspension concentrate composition is a suspension concentrate comprising about 35% w/w to about 50% w/w water; about 0.2% w/w to about 0.8% w/w wetting agent (Aerosol OT-B); about 0.75% w/w to about 1.75% w/w anionic tristyrylphenol phosphate surfactant (Soprophor FLK); about 1% w/w to about 5% w/w siloxane-based non-ionic surfactant (Break-Thru S 233); about 0.1% w/w to about 1% w/w anti-foaming agent (Sag 30); about 30% w/w to about 60% w/w solid particulate novaluron; about 5% w/w to about 15% w/w propylene glycol; about 0.1% w/w to about 0.5% w/w xanthan gum; and about 0.1% w/w to about 1% w/w preservative (Proxel GXL).

In some aspects, the suspension concentrate composition is a suspension concentrate comprising about 10% w/w to about 15% w/w solid particulate diflubenzuron; about 1% w/w to about 5% w/w siloxane-based non-ionic surfactant (Break-Thru S 233); about 1% w/w to about 3% w/w non-ionic surfactant (Step-Flow 26 F); about 0.1% w/w to about 1% w/w anti-foaming agent (Sag 30); about 5% w/w to about 15% w/w propylene glycol; about 0.1% w/w to about 0.5% w/w xanthan gum; about 0.1% w/w to about 0.5% w/w preservative (Proxel GXL); and about 60% w/w to about 70% w/w water.

In some aspects, the suspension concentrate composition is a suspension concentrate comprising about 15% w/w to about 25% w/w solid particulate lufenuron; about 1% w/w to about 5% w/w siloxane-based non-ionic surfactant (Break-Thru S 233); about 1% w/w to about 3% w/w non-ionic surfactant (Step-Flow 26 F); about 0.1% w/w to about 1% w/w anti-foaming agent (Sag 30); about 5% to about 15% w/w propylene glycol; about 0.1% w/w to about 0.5% w/w xanthan gum; about 0.1% w/w to about 0.5% w/w preservative (Proxel GXL); and about 60% w/w to about 70% w/w water.

In some aspects, the suspension composition is a suspension concentrate further comprising fertilizer granules having the suspension concentrate deposited thereon, wherein the chitin synthesis inhibitor is novaluron, and the chitin synthesis inhibitor granules comprise novaluron ranging from about 0.05% to about 5% novaluron by wt, from about 0.05% to about 4% novaluron by wt, from about 0.1% to about 1% novaluron by wt, or from about 0.2% to about 0.5% novaluron by wt.

Another aspect of the present disclosure encompasses a pesticidal granule comprising a pesticidal suspension composition deposited thereon. In some aspects, the chitin synthesis inhibitor is novaluron, and the granules comprise novaluron ranging from about 0.05% to about 5% novaluron by wt, from about 0.05% to about 4% novaluron by wt, from about 0.1% to about 1% novaluron by wt, or from about 0.2% to about 0.5% novaluron by wt.

Another aspect of the present disclosure encompasses a pesticidal powder composition comprising a solid particulate chitin synthesis inhibitor. In some aspects, the powder composition comprises about 0.08% w/w to about 0.5% w/w solid particulate novaluron; about 70% w/w to about 80% w/w attapulgite dispersion; and about 20% w/w to about 30% w/w corn grit 14/20.

In some aspects, the powder composition comprises about 0.08% w/w to about 0.5% w/w solid particulate novaluron; about 70% w/w to about 80% w/w brewer's yeast; about 20% w/w to about 30% w/w corn grit 14/20; and about 1% w/w to about 2% w/w crushed limestone.

In other aspects, the powder composition comprises about 0.08% w/w to about 0.5% w/w solid particulate novaluron, about 70% w/w to about 80% w/w brewer's yeast, about 20% w/w to about 30% w/w corn grit 14/20, and about 1% w/w to about 2% w/w crushed limestone.

II. METHODS

One aspect of the present disclosure encompasses a method of controlling a target pest. The method comprises contacting the pest with a pesticidally effective amount of a composition comprising a pesticidally effective concentration of a pesticidally active solid particulate chitin synthesis inhibitor. The composition can be as described in Section I above.

A pesticidally effective amount may be determined by the efficacy or potency of the particular composition, the pest being controlled, the duration or frequency of application of the pesticidal composition, and the method of application of the composition. A pesticidally effective amount can be determined using methods known in the art, and can be determined experimentally. Additionally, the method of application may be considered when determining the pesticidally effective amount. In determining pesticidally effective amounts, one skilled in the art may also consider the existence of resistance of the pest to pesticides. Importantly, the pest can be contacted at any stage of development of the pest. This is because the method can control current and future pest generations independent of application timing with respect to the life stage of the pest.

III. KITS

A further aspect of the present disclosure provides kits comprising one or more pesticidal compositions comprising a pesticidally effective concentration of a pesticidally active solid particulate chitin synthesis inhibitor detailed above in Section I. The one or more pesticidal compositions may be administered by a method described above in Section II.

The kits may further comprise a suspending vehicle appropriate for diluting a suspension concentrate composition. The compositions can be packaged in one or more containers. The containers can further comprise means of administering or measuring the compositions. For instance, if the composition is a suspension concentrate, the container may further comprise a means of spraying the composition, and a measuring cup for measuring an appropriate volume of the concentrate for dilution. When the composition is a powder composition, the container can be a container operable to spray the powder.

The kits provided herein generally include instructions for carrying out the methods detailed above. Instructions included in the kits may be affixed to packaging material or may be included as a package insert. While the instructions are typically written or printed materials, they are not limited to such. Any medium capable of storing such instructions and communicating them to an end user is contemplated by this disclosure. Such media include, but are not limited to, electronic storage media (e.g., magnetic discs, tapes, cartridges, chips), optical media (e.g., CD ROM), and the like. As used herein, the term "instructions" may include the address of an internet site that provides the instructions.

Definitions

Unless defined otherwise, all technical and scientific terms used herein have the meaning commonly understood by a person skilled in the art to which this invention belongs. The following references provide one of skill with a general definition of many of the terms used in this invention: Singleton et al., Dictionary of Microbiology and Molecular Biology (2nd ed. 1994); The Cambridge Dictionary of Science and Technology (Walker ed., 1988); The Glossary of Genetics, 5th Ed., R. Rieger et al. (eds.), Springer Verlag (1991); and Hale & Marham, The Harper Collins Dictionary of Biology (1991). As used herein, the following terms have the meanings ascribed to them unless specified otherwise.

When introducing elements of the present disclosure or the preferred aspects(s) thereof, the articles "a", "an", "the" and "said" are intended to mean that there are one or more of the elements. The terms "comprising", "including" and "having" are intended to be inclusive and mean that there may be additional elements other than the listed elements.

The term "pesticidally effective amount" as used herein refers to an amount effective, at dosages, and for periods of time necessary, to achieve the desired result with respect to the control of a pest. For example, in the control of an agricultural pest, an agent (i.e., a compound or a composition) which decrease, prevents, delays or suppresses or arrests damage to an agricultural crop caused by a pest would be effective. The pesticidally effective amount may be divided into one, two or more applications in a suitable form to be applied one, two or more times throughout a designated time period.

As various changes could be made in the above-described cells and methods without departing from the scope of the invention, it is intended that all matter contained in the above description and in the examples given below, shall be interpreted as illustrative and not in a limiting sense.

EXAMPLES

All patents and publications mentioned in the specification are indicative of the levels of those skilled in the art to which the present disclosure pertains. All patents and publications are herein incorporated by reference to the same extent as if each individual publication was specifically and individually indicated to be incorporated by reference.

The publications discussed throughout are provided solely for their disclosure before the filing date of the present application. Nothing herein is to be construed as an admission that the invention is not entitled to antedate such disclosure by virtue of prior invention.

The following examples are included to demonstrate the disclosure. It should be appreciated by those of skill in the art that the techniques disclosed in the following examples represent techniques discovered by the inventors to function well in the practice of the disclosure. Those of skill in the art should, however, in light of the present disclosure, appreciate that many changes could be made in the disclosure and still obtain a like or similar result without departing from the spirit and scope of the disclosure, therefore all matter set forth is to be interpreted as illustrative and not in a limiting sense.

Example 1. Efficacy of Solid Particulate Chitin Synthesis Inhibitor Compositions as a Direct Spray Against Bed Bugs Bed Bugs (*Cimex lectularius*) Harlan, lab susceptible, 1st and 2nd instar insects were placed into mesh cartridges for treatment. Ten insects were used with five replications. The insects were treated with one second of spray and transferred to a clean container after the application. Mortality was observed. The results are shown in Table 1. Tested compositions:

- Novaluron emulsifiable concentrate (EC) (9.4% Novaluron)
- Novaluron suspension concentrate (SC) (10% Novaluron)
- Novaluron+Pyriproxyfen I EC (1.3% Novaluron, 1.3% Pyriproxyfen)
- Novaluron+Pyriproxyfen II EC (1.3% Novaluron, 1.3% Pyriproxyfen)

TABLE 1

| Treatment | Test Substance | 4 hr | 24 hr | 48 hr | 72 hr | 96 hr |
|---|---|---|---|---|---|---|
| 1A | Control - Untreated A | 0% | 0% | 0% | 0% | 0% |
| 1B | Control - Untreated B | 0% | 0% | 0% | 0% | 0% |
| 2 | Novaluron EC (0.3 oz/1 gal) | 22% | 32% | 38% | 42% | 44% |

TABLE 1-continued

| Treatment | Test Substance | 4 hr | 24 hr | 48 hr | 72 hr | 96 hr |
|---|---|---|---|---|---|---|
| 3 | Novaluron EC (3.0 oz/1 gal) | 18% | 38% | 44% | 62% | 66% |
| 4 | Novaluron SC (0.3 oz/1 gal | 34% | 64% | 82% | 82% | 82% |
| 5 | Novaluron SC (3.0 oz/1 gal) | 60% | 64% | 72% | 70% | 70% |
| 6 | Novaluron + Pyriproxyfen I EC (2.0 oz/1 gal) | 50% | 66% | 74% | 80% | 86% |
| 7 | Novaluron + Pyriproxyfen II EC (2.0 oz/1 gal) | 56% | 50% | 68% | 74% | 76% |

Surprisingly, both rates of the Novaluron SC outperformed the EC composition through 96 hours, reaching 82% mortality for the low rate and 70% mortality for the high rate; the EC composition showed 44% and 66% mortality. The high rate of the Novaluron SC composition showed early timing superiority vs. the Novaluron EC and Novaluron+Pyriproxyfen combination products, with 60% mortality within 4 hours. The combination products (Novaluron+Pyriproxyfen) performed similarly to each other, with the I composition providing faster and more complete mortality than the II composition.

Example 2. Efficacy of Solid Particulate Chitin Synthesis Inhibitor Compositions as a Direct Spray Against Darkling Beetles In the course of a study to determine whether emulsifiable concentrate (EC) and dust compositions of novaluron had reproductive effects on adult darkling beetles (*Alphitobius diaperinus*; Coleoptera: Tenebrionidae), very surprising and unexpected results were observed for the dust composition.

In short, this study was conducted in ½ gallon plastic tubs containing ≈0.2 kg of broiler house litter. After the litter in the tubs was treated, 50 adult beetles were put into each tub, food was added, and the chambers covered and held at ≈80° F. (27° C.) for 7 days. After 7 days, each chamber was opened, all 50 beetles were removed, and the numbers of dead and live beetles were counted. Each group of 50 adult beetles (dead+alive) was then placed into a clean tub with untreated litter. Food was added and the chambers were covered and held at ≈80° F. (27° C.) for an additional 7 days. After 7 days, each chamber was opened, all 50 beetles were removed, and the numbers of dead and live beetles were counted.

There were significant differences ($p=0.001$) between the treatments after 14 days. Counts of dead adult beetles in chambers treated with the 0.2% dust were significantly higher ($p<0.05$) than those treated with the novaluron EC and the controls (Table 2). Although novaluron exposure ended after 7 days, mortality of beetles exposed to the dust more than doubled between 7 and 14 days (Table 2).

TABLE 2

Mean counts of dead adult darkling beetles in each treatment group and percent reduction compared to the controls. Means followed by different letters are significantly different ($p < 0.05$).

| Evaluation | Treatment | n | Mean | % Reduction |
|---|---|---|---|---|
| 7 Days | 0.2% novaluron dust | 10 | 6.1 a | 9.1% |
| | Novaluron EC | 10 | 2.2 ab | 1% |
| | Untreated Control | 10 | 1.7 ab | — |
| 14 Days | 0.2% novaluron dust | 10 | 14.2 a | 19.3% |
| | Novaluron EC | 10 | 2.2 b | 1% |
| | Untreated Control | 10 | 1.9 b | — |

Several results of this study were very surprising and unexpected: (1) significant adult beetle mortality following exposure to an insect growth regulator (IGR) like novaluron, which is typically applied to control larval insects by disrupting molting; (2) mortality in beetles exposed to the dust was significantly different from the EC composition; and (3) mortality in beetles exposed to the novaluron dust more than doubled during the week after their exposure ended, but there was no such increase in the EC group.

Example 3. Efficacy of Solid Particulate Chitin Synthesis Inhibitor Compositions Against Annual Bluegrass Weevil in Turf Applications The annual bluegrass weevil (ABW; *Listronotus maculicollis*) is a serious pest of golf course turf in the Northeast and Mid-Atlantic regions of the US, with its range expanding outward. This pest is increasingly difficult to control due to multiple generations per growing season and increasing resistance to available insecticides. Chemical control programs typically require a carefully timed adulticide application, followed by applications of additional chemistries aimed at controlling larval stages over a three-month period.

Programs typically use scouting, plant phenology indicators, and growing degree day models to target three "stages" of first-generation development:

Stage 1: Peak adult migration/egg laying; pyrethroids, chlorpyrifos

Stage 2: Larval instars 1-3 feeding inside of turf stems; systemic diamides

Stage 3: Larval instars 4-5 feeding externally on crowns; spinosad, indoxacarb

If satisfactory control of the first generation is not achieved, it becomes increasingly difficult to achieve due to overlapping life cycles as the season progresses. Control is further complicated due to varying efficacy of pesticide chemistries based on the targeted stage. Many pyrethroid-resistant populations have been confirmed, and resistance to Stage 2 and 3 approaches is increasingly suspected.

Due to novaluron's mode of action and its very limited systemic movement, it was assumed in 2019 that the logical timing for investigating it for ABW control would be Stage 3, to increase the likelihood of contact with larvae feeding externally. Targeting a larval stage was also assumed to be ideal since novaluron causes abortive molting. Two novaluron compositions were tested by the inventors in turf disease management. The compositions were applied at Stage 3 on an ABW field population, described by the inventors as "the most difficult I have ever worked with." ABW densities in control plots were nearly double the accepted action threshold. The following conclusions were made:

All novaluron treatments provided good to excellent ABW control as a single larvicide application.

Turfgrass quality in the novaluron suspension concentrate (SC; 0.9 lbs Al/acre) plots was significantly better than the untreated controls, but not the other treatments.

Novaluron SC (0.9 lbs Al/acre) provided the greatest numerical reduction (92%) of ABW larvae. This was the highest ranked single application treatment in the 2019 ABW field trials.

This work was repeated in 2020 at two additional sites. In both studies novaluron controlled late instar larvae similar to industry standards.

Based on 2019 results and documented reproductive effects in other weevil and beetle species, in 2020 the inventors tested Novaluron SC against the same "difficult" population of ABW at all three first generation stages with the following results:

Good to excellent control with most Novaluron SC treatments when applied to a moderately resistant ABW population.

Single Novaluron SC applications caused reductions comparable to, or better than those observed with conventional insecticide programs (i.e. sequential applications).

Novaluron SC rate had a significant effect on ABW reduction. The high rate (136 fl oz/A) was significantly better (97% control) than the low rate (68 fl oz/A; 48%), but not the medium rate (102 fl oz; 70%).

Medium and high rates of Novaluron SC had better ABW control than the three-pesticide application industry standards bifenthrin (Stage 1), cyantraniliprole (Stage 2), and spinosad (Stage 3).

Earlier applications trended for improved control, as adult-timed applications (86% control) and early-instar larvae-timed (84%) applications performed better than late-instar applications (33%).

The inventors also completed a 2020 laboratory study to examine potential reproductive effects when adult ABW were directly treated or introduced to arenas containing *Poa annua* (annual bluegrass) which were treated 7 days later ("egg-sprayed") and larvae extracted 12 days after the start of the experiment:

Novaluron SC provided excellent suppression of ABW larvae when applied directly to adults (91-98% control) or after the oviposition period (67-85% control).

Novaluron SC applied directly to adults prior to placement on turf resulted in four-fold fewer larvae than direct egg-spray treatments. Timing was statistically significant, though means separation was not possible.

Novaluron SC rate was not a statistically significant factor, though the 136 fl oz./ac rate contained two-fold fewer larvae than the 102 fl oz/ac treatment.

In summary, Novaluron SC has the following unique advantages against ABW:

1. Novaluron has never been labeled for turfgrass use and is therefore a resistance management tool.
2. Equal or superior control compared to industry standards at all three first generation timing "stages" typically targeted. This timing-independence is unique in ABW management and was unexpected. This could also potentially reduce the need for such intense scouting and tracking in predicting peak timings for management of first generation ABW.
3. Timing-independence is very useful for targeting staggered growth stages of second and subsequent generations due to poor timing of, or resistance to current standards.
4. Controlling a resistant population with a single application reduces the need for the standard practice of multiple applications typically needed to achieve the same level of control. This was unexpected.

Example 4. Efficacy of Solid Particulate Chitin Synthesis Inhibitor Compositions Against Southern Chinch Bug in Turf Applications Chinch bugs (*Blissus insularis*) are the most serious pest of St. Augustine grass in the US. Control programs rely on pyrethroids and/or neonicotinoids, with documented resistance to both chemical classes. Multiple overlapping generations during the growing season with year-round activity in the southernmost portion of its range and only two potentially effective chemical classes makes Novaluron SC a very valuable resistance management tool.

In 2019, a study was conducted by the inventors to determine the effects of Novaluron SC on chinch bugs. Nymphs and St. Augustine grass stolons were treated with Novaluron SC, maintained in arenas, and observed for 21 days after treatment:

Chinch bug nymph mortality was significantly higher than untreated control for medium (102 fl oz./acre) and high (136 fl oz./acre) rates of Novaluron SC at 2, 5, 8, 12, 16, and 21 days after treatment.

Significant intoxication was observed in the first 8 days for Novaluron SC treatments versus untreated control.

Novaluron SC treatments had statistically fewer shed exoskeletons than untreated control.

Example 5. Influence of Application Rate and Timing on Performance of Novaluron for Preventive Control of Scarab Beetle Larvae in Cool Season Turfgrass—First Study The primary objectives of this study were to evaluate the influence of application rate and timing on the efficacy of novaluran applied preventively against scarab larvae in cool-season turfgrass. The experiment was located on a stand of turfgrass consisting primarily of Kentucky bluegrass maintained at 7.6 cm. Plots measuring 5×5 ft were arranged in a randomized complete-block design with 2 ft alleys between plots. All materials were applied on June 25$^{th}$ and July 9$^{th}$ using a hand-held $CO_2$ boom sprayer configured with four 8010 nozzles operating at 30 psi and calibrated to deliver a spray volume of 2 gal/M. Granular formulations (Granule with 25% Novaluron SC applied thereon) were applied using a hand-operated shaker jar to ensure even distribution of materials over the entire plot area. Each treatment was replicated 4 times. Plots were irrigated Immediately after each set of applications (0.1").

Field conditions on the June 25$^{th}$ application date were:

(1) Soil Temp: 21° C.
(2) Air Temp: 23° C.
(3) Weather: Clear
(4) Wind Speed: 0-6 mph
(5) Thatch: 1 cm
(6) Soil Texture: 14:56:30 (Sand:Silt:Clay)

(7) Soil organic matter: 6.7%

Field conditions on the July 9$^{th}$ application date were:

(1) Soil Temp: 27° C.

(2) Air Temp: 27° C.

(3) Weather: Partly Cloudy (4) Wind Speed: 0-5 mph

Japanese beetle larval infestations were created by driving two, 20.3 cm diameter PVC cylinders into each plot along its mid-line and caging one group of 40 Japanese beetle adults (50:50 sex ratio) within each cylinder during early July. Scarab larval populations were assessed Oct. 12-16, 2019 using a sod cutter to remove a strip of sod lying directly beneath the caging area of each plot and examining the soil to a depth of 3 inches. All scarab larvae recovered from the plots were identified to genus level, counted and recorded. Variation in scarab larval populations was examined using main effects ANOVA and treatment means were compared using Fisher's LSD test (α=0.05). Treatments and application dates were as described in Table 3.

Example 6. Influence of Application Rate and Timing on Performance of Novaluron for Preventive Control of Scarab Beetle Larvae in Cool Season Turfgrass—Second Study As with the study of Example 5 above, the purpose of this study was to evaluate rates and timings of novaluron and a wetting agent (Syringe) for controlling white grubs in turfgrass. A trial was conducted on Kentucky bluegrass maintained at a height of 7.6 cm. A randomized complete block design with 4 replications of 5'×5' plots were used. Treatments were applied and all plots were watered in (0.1") immediately after application. Treatments and application dates were as described in Table 4. Caged Japanese beetle adults (20 male: 20 female) were placed within each plot. Plots were assessed using a sod cutter set to 3" depth. All scarab beetle larvae recovered were identified to genus level.

TABLE 3

Mean number (±SE) and percent (%) control of scarab larvae larvae in plots of Kentucky Bluegrass treated with Novaluran alone and in combination with Chlorantraniliprole.

| Product | Application Rate | Application Date | Mean JB Larvae/ft$^2$ (±SE) | Mean WG Larvae/ft$^2$ (±SE) | % Control (WG) |
|---|---|---|---|---|---|
| Untreated | — | — | 4.25 ± 0.75 a | 5.00 ± 0.91 a | — |
| Nova 10 SC | 0.78 fl. oz./1000 ft$^2$ | June 25 | 1.00 ± 0.41 b | 1.25 ± 0.63 bc | 75.0 |
| Nova 10 SC | 1.56 fl. oz./1000 ft$^2$ | June 25 | 0.00 ± 0.00 b | 0.00 ± 0.00 b | 100.0 |
| Nova 10 SC | 2.34 fl. oz./1000 ft$^2$ | June 25 | 0.50 ± 0.50 b | 0.50 ± 0.50 bc | 90.0 |
| Nova 10 SC | 3.12 fl. oz./1000 ft$^2$ | June 25 | 0.50 ± 0.29 b | 0.50 ± 0.29 bc | 90.0 |
| Nova 10 SC + Syringe Surfactant | 2.34 + 0.74 fl oz/1000 ft$^2$ | June 25 | 0.50 ± 0.50 b | 1.25 ± 0.75 bc | 75.0 |
| Nova 10 SC + Syringe Surfactant | 3.12 + 0.74 fl oz/1000 ft$^2$ | June 25 | 0.75 ± 0.75 b | 0.75 ± 0.75 bc | 85.0 |
| Nova 0.225% G | 6.88 lbs./1000 ft$^2$ | June 25 | 1.00 ± 0.71 b | 1.00 ± 0.71 bc | 80.0 |
| Nova 10 SC | 0.78 fl. oz./1000 ft$^2$ | July 9 | 0.25 ± 0.25 b | 0.75 ± 0.75 bc | 85.0 |
| Nova 10 SC | 1.56 fl. oz./1000 ft$^2$ | July 9 | 1.75 ± 1.44 b | 2.50 ± 1.55 c | 50.0 |
| Nova 10 SC | 2.34 fl. oz./1000 ft$^2$ | July 9 | 0.50 ± 0.29 b | 0.75 ± 0.48 bc | 85.0 |
| Nova 10 SC | 3.12 fl. oz./1000 ft$^2$ | July 9 | 0.75 ± 0.48 b | 0.75 ± 0.48 bc | 85.0 |
| Nova 10 SC + Syringe Surfactant | 2.34 + 0.74 fl oz/1000 ft$^2$ | July 9 | 0.50 ± 0.29 b | 0.50 ± 0.29 bc | 90.0 |
| Nova 10 SC + Syringe Surfactant | 3.12 + 0.74 fl oz/1000 ft$^2$ | July 9 | 0.25 ± 0.25 b | 0.25 ± 0.25 bc | 95.0 |
| Nova 0.225% G | 6.88 lbs./1000 ft$^2$ | July 9 | 0.50 ± 0.50 b | 0.50 ± 0.50 bc | 90.0 |

Nova SC: Suspension concentrate of Novaluron.

Nova G: Granule with 25% Novaluron SC applied thereon.

Syringe surfactant: Wetting agent normally used in turfgrass applications.

JB = Japanese beetle,

WG = all white grubs

Untreated controls: 85.0% JB, 15.0% Masked Chafers.

*Numbers in same column followed by different letters are significantly different at α = 0.05

Figure 3:
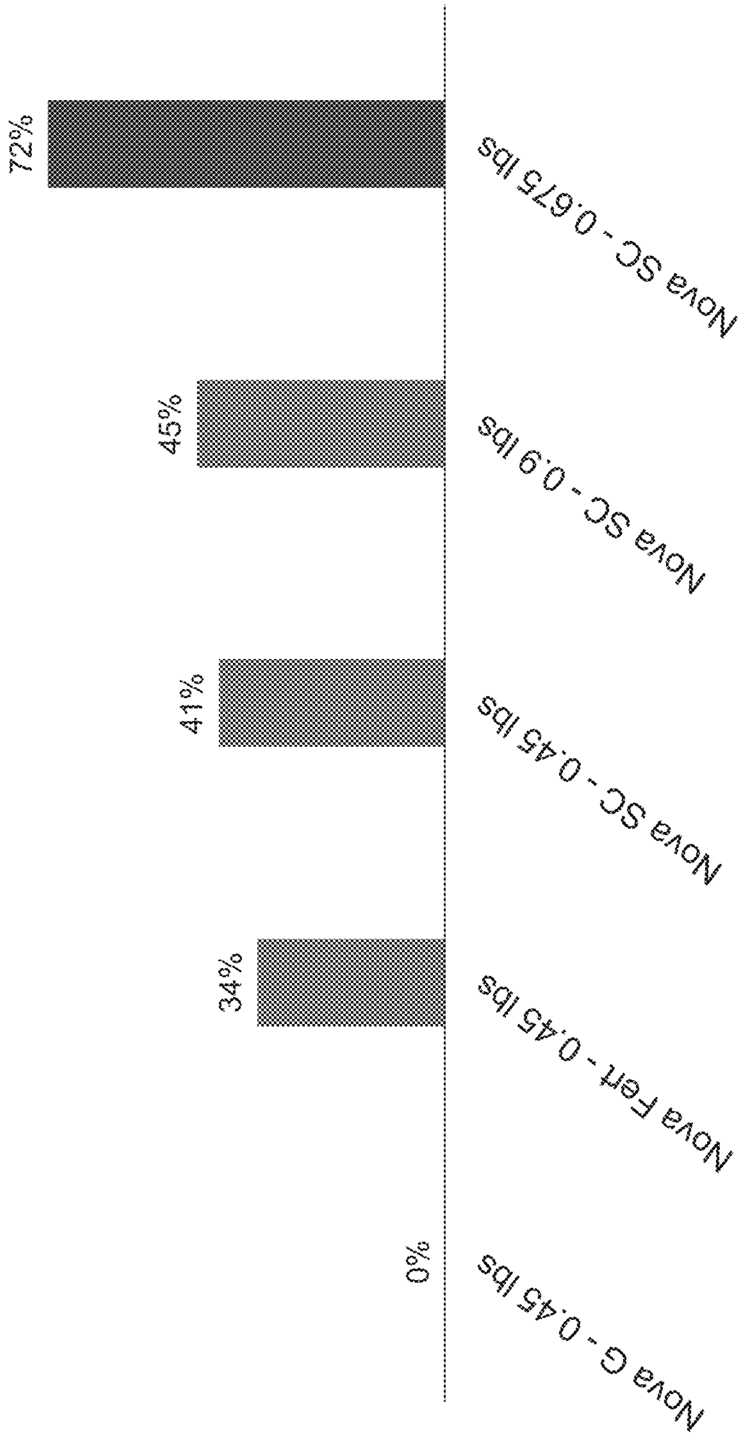
FIG. 3 is a plot showing percent grub control for the June application of treatment in study conducted in 2019. Purple Bars=Significantly Different from Untreated Control Plots.
Figure 4:
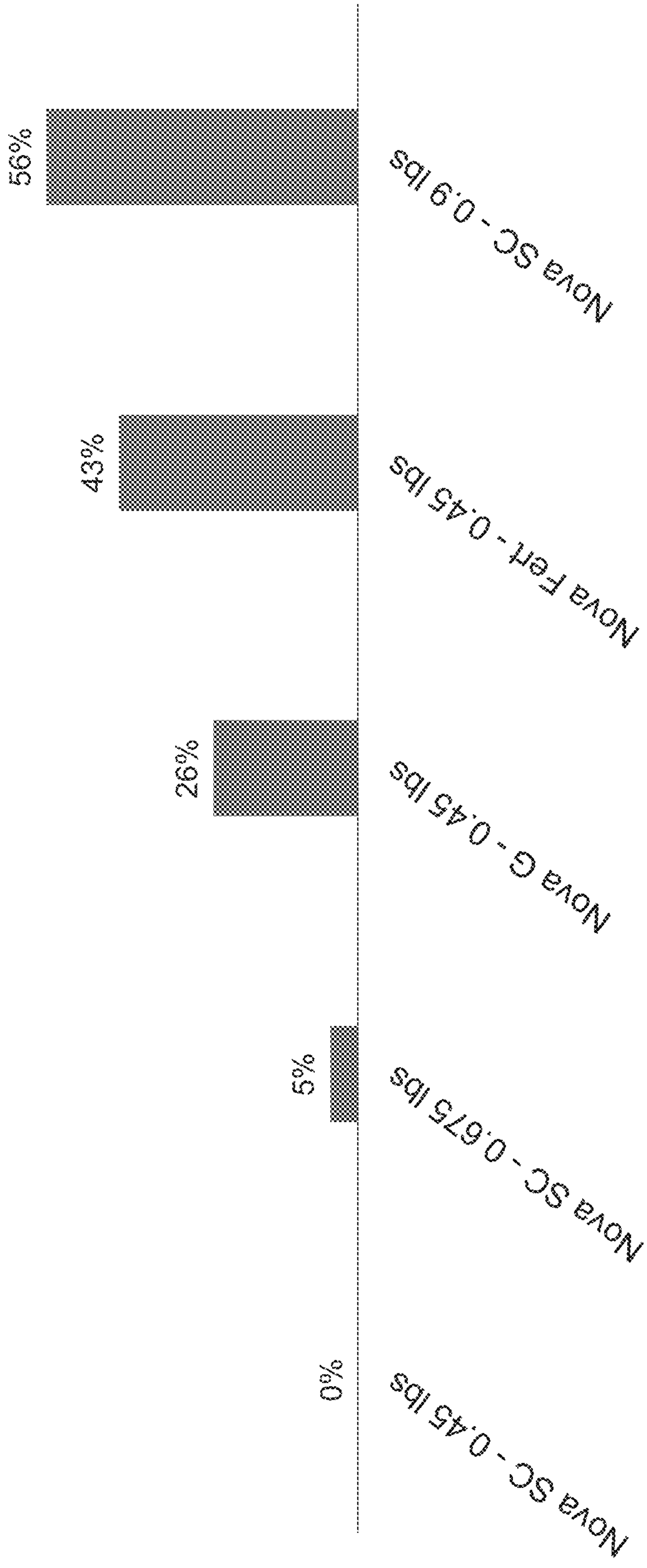
FIG. 4 is a plot showing percent grub control for the July application of treatment in study conducted in 2019.
Figure 5:
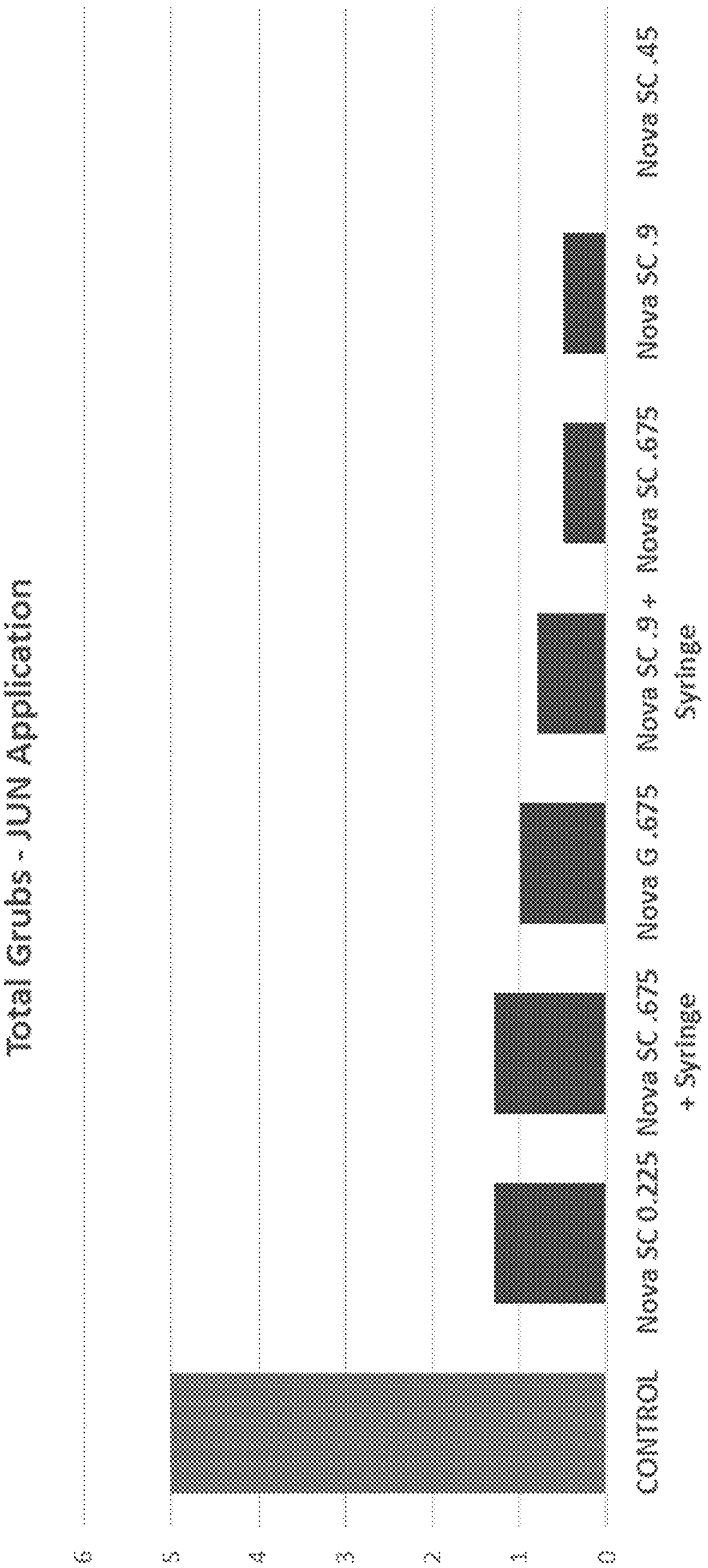
FIG. 5 is a plot showing total grub counts for June application in study conducted in 2020. Purple Bars=Significantly Different from Untreated Control Plots.
Figure 6:
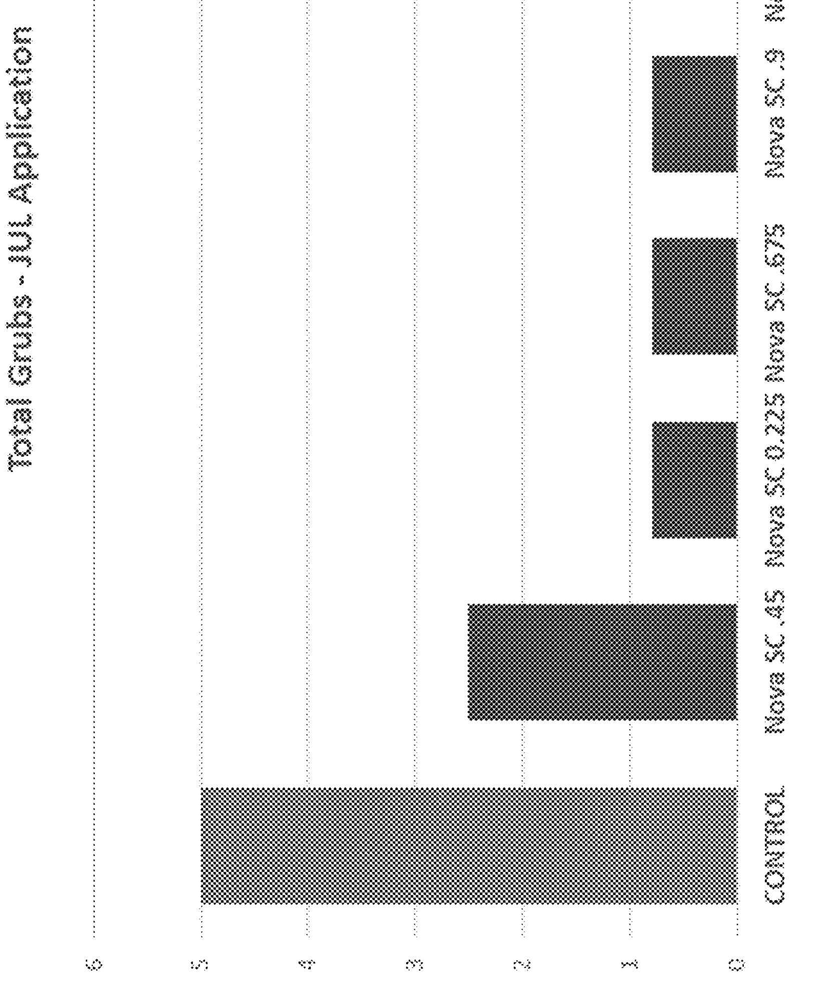
FIG. 6 is a plot showing total grub counts for July application in study conducted in 2020. Purple Bars=Significantly Different from Untreated Control Plots.
Figure 7:
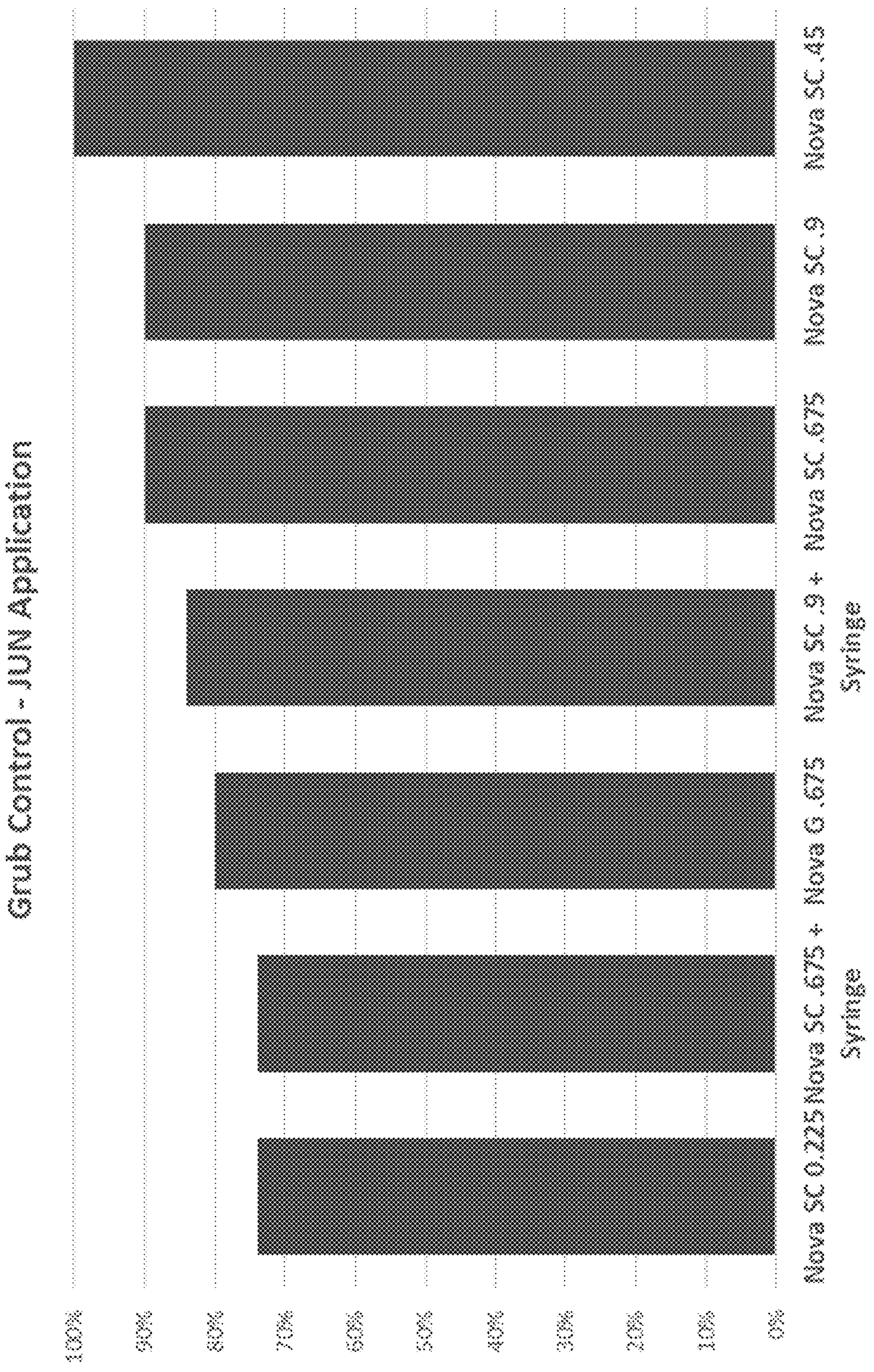
FIG. 7 is a plot showing percent grub control for June application in study conducted in 2020. Purple Bars=Significantly Different from Untreated Control Plots. All treatments were significantly different from untreated control.
Figure 8:
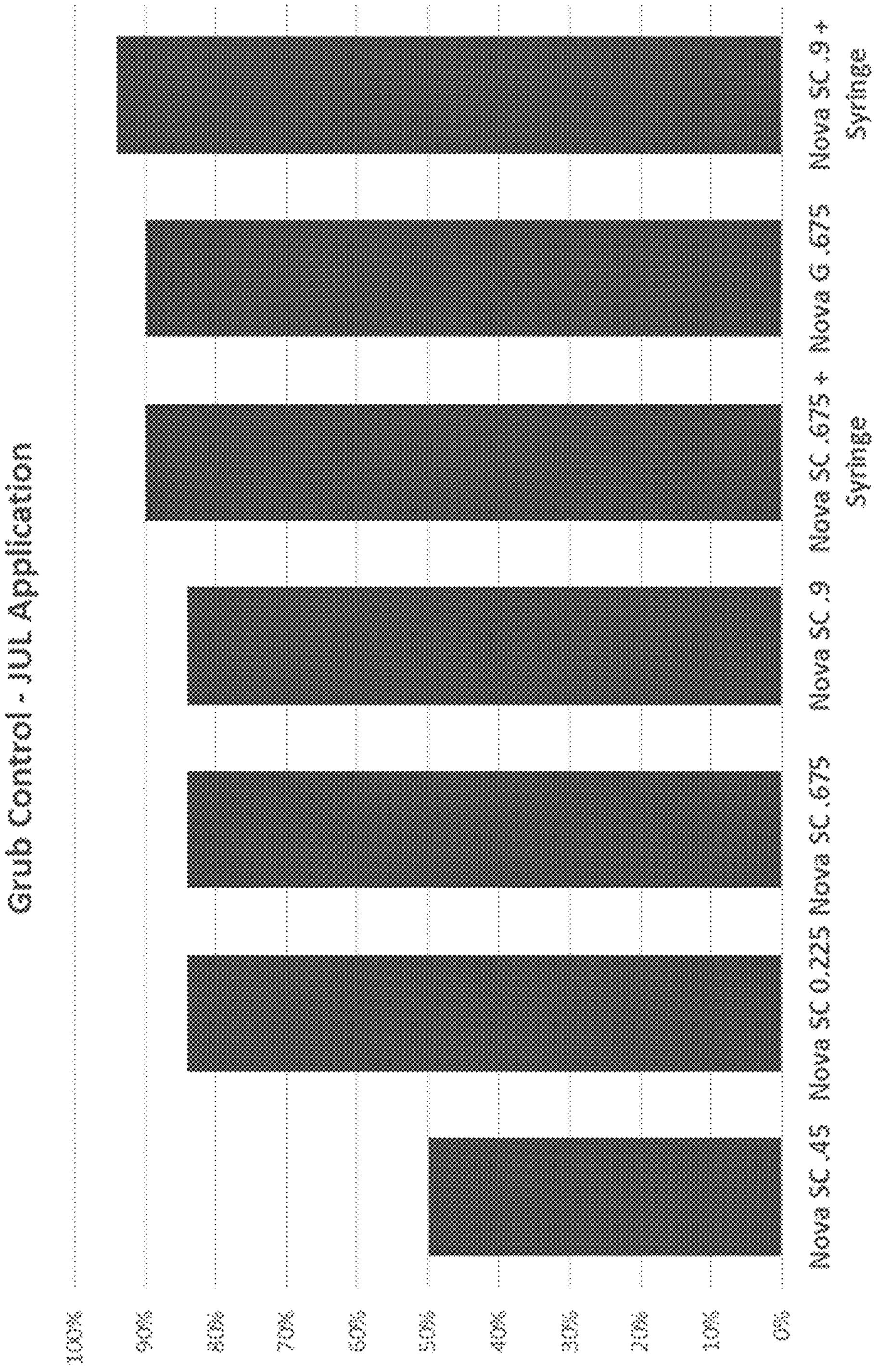
FIG. 8 is a plot showing percent grub control for July application in study conducted in 2020. Purple Bars=Significantly Different from Untreated Control Plots. All treatments were significantly different from untreated control.

All treatments significantly reduced scarab larval densities compared to the untreated control with overall levels of control ranging from 75-100% (Table 3 and FIGS. 3 and 4). In general, the highest levels of control were provided by treatments containing Acelepryn. However, due in part to lower than normal infestations levels, all treatments provided statistically similar reductions in scarab larval densities and all treatments provided acceptable levels of control (>70%). No differences in turf quality were observed at any point during the study and visible damage was never apparent.

TABLE 4

| Product | Application Rate | Application Date |
|---|---|---|
| Untreated | — | — |
| Nova 10 SC | 0.78 fl oz./1000 ft$^2$ | June 25 |
| Nova 10 SC | 1.56 fl. oz./1000 ft$^2$ | June 25 |
| Nova 10 SC | 2.34 fl. oz./1000 ft$^2$ | June 25 |
| Nova 10 SC | 3.12 fl. oz./1000 ft$^2$ | June 25 |
| Nova 10 SC + Syringe Surfactant | 2.34 + 0.74 fl oz/1000 ft$^2$ | June 25 |

TABLE 4-continued

| Product | Application Rate | Application Date |
|---|---|---|
| Nova 10 SC + Syringe Surfactant | 3.12 + 0.74 fl oz/1000 $ft^2$ | June 25 |
| Nova 0.225% G | 6.88 lbs./1000 $ft^2$ | June 25 |
| Nova 10 SC | 0.78 fl. oz./1000 $ft^2$ | July 9 |
| Nova 10 SC | 1.56 fl. oz./1000 $ft^2$ | July 9 |
| Nova 10 SC | 2.34 fl. oz./1000 $ft^2$ | July 9 |
| Nova 10 SC | 3.12 fl. oz./1000 $ft^2$ | July 9 |
| Nova 10 SC + Syringe Surfactant | 2.34 + 0.74 fl oz/1000 $ft^2$ | July 9 |
| Nova 10 SC + Syringe Surfactant | 3.12 + 0.74 fl oz/1000 $ft^2$ | July 9 |
| Nova 0.225% G | 6.88 lbs./1000 $ft^2$ | July 9 |

Nova SC: Suspension concentrate of Novaluron.
Nova G: Granule with 25% Novaluron SC applied thereon.
Syringe surfactant: Wetting agent normally used in turfgrass applications.

The results (FIGS. 5-8) show that:

Untreated controls averaged 85% Japanese beetles and 15% masked chafers.

All treatments significantly reduced grub densities compared to untreated control.

There was no significant difference between application timings.

No differences in turf quality were observed. Grub damage was never apparent.

Control was similar for Japanese and masked chafer beetles. The addition of a wetting agent (Syringe) did not improve performance of novaluron treatments. Novaluron G formulation appeared to perform similarly to the equivalent Nova 10 2.34 fl oz treatment (both equal to 0.675 lb ai/acre).

It was noticed that mean grub counts in untreated plots were unusually low (average of 5 per plot) during the season this study was performed. With identical methods, timings, and location, untreated grub counts in the prior season averaged 19 per plot. Novaluron treatments had better control than in the study described in Example 5 above. Novaluron at 0.675 lb ai/A had 46-72% control in the study of Example 5, vs. 84-90% control in the instant study. Novaluron at 0.9 lb ai/A had 45-56% control in the study of Example 5, vs. 84-90% control in the instant study. Novaluron G formulation was altered from the study of Example 5 and rate was increased from 0.45 lb/acre to 0.675 lb/acre. Control in the study of Example 5 was 0-26% compared to control in the instant study of 80-90%.

What is claimed is:

1. A pesticidal powder composition comprising a solid particulate insect growth regulator, the composition comprising:

a. about 0.08% w/w to about 0.5% w/w solid particulate novaluron;

b. about 70% w/w to about 80% w/w attapulgite; and

C. about 20% w/w to about 30% w/w corn grit 14/20.

2. A pesticidal powder composition comprising a solid particulate insect growth regulator, the composition comprising:

a. about 0.08% w/w to about 0.5% w/w solid particulate diflubenzuron;

b. about 70% w/w to about 80% w/w brewer's yeast;

C. about 20% w/w to about 30% w/w corn grit 14/20; and d. about 1% w/w to about 2% w/w crushed limestone.

3. A pesticidal powder composition comprising a solid particulate insect growth regulator, the composition comprising:

about 0.08% w/w to about 0.5% w/w solid particulate novaluron;

about 70% w/w to about 80% w/w brewer's yeast;

about 20% w/w to about 30% w/w corn grit 14/20; and about 1% w/w to about 2% w/w crushed limestone.

* * * * *